United States Patent
Zetune

(10) Patent No.: US 9,619,688 B2
(45) Date of Patent: *Apr. 11, 2017

(54) NAVIGATION USING PORTABLE READING MACHINE

(71) Applicant: KNFB Reader, LLC, Baltimore, MD (US)

(72) Inventor: Rafael Maya Zetune, Chestnut Hill, MA (US)

(73) Assignee: KNFB READER, LLC, Baltimore, MD (US)

(*) Notice: Subject to any disclaimer, the term of this patent is extended or adjusted under 35 U.S.C. 154(b) by 643 days.

This patent is subject to a terminal disclaimer.

(21) Appl. No.: 14/048,215

(22) Filed: Oct. 8, 2013

(65) Prior Publication Data

US 2014/0037149 A1 Feb. 6, 2014

Related U.S. Application Data

(63) Continuation of application No. 12/433,846, filed on Apr. 30, 2009, now Pat. No. 8,554,464.

(60) Provisional application No. 61/049,311, filed on Apr. 30, 2008.

(51) Int. Cl.
*G01C 21/00* (2006.01)
*G06K 9/00* (2006.01)
*G01C 21/20* (2006.01)
*G06K 9/46* (2006.01)

(52) U.S. Cl.
CPC ............ *G06K 9/00* (2013.01); *G01C 21/00* (2013.01); *G01C 21/20* (2013.01); *G01C 21/206* (2013.01); *G06K 9/00664* (2013.01); *G06K 9/469* (2013.01); *G06K 2209/01* (2013.01)

(58) Field of Classification Search
CPC ...... G01C 21/00; G01C 21/20; G01C 21/206; G06K 9/00664; G06K 9/469; G06K 2209/01
See application file for complete search history.

(56) References Cited

U.S. PATENT DOCUMENTS

| | | | | |
|---|---|---|---|---|
| 2005/0286743 | A1* | 12/2005 | Kurzweil | G10L 13/00 382/114 |
| 2006/0006235 | A1* | 1/2006 | Kurzweil | G06K 9/00993 235/454 |
| 2009/0043489 | A1* | 2/2009 | Weidner | G01C 21/20 701/533 |

OTHER PUBLICATIONS

Michael Dresser. 1993. Blind May Read the Future Technology offers hope for access to more of world :[Final Edition]. The Sun, Nov. 5, http://www.proquest.com/(accessed Aug. 3, 2012; cited in the parent U.S. Appl. No. 12/433,846 now U.S. Pat. No. 8,554,464.*
Sakhr Software releases reading machine 1.5 for the visually impaired. 2001. Middle East News Online, Oct. 1, http://www.proquest.com/(accessed Aug. 3, 2012), cited in the parent U.S. Appl. No. 12/433,846 now U.S. Pat. No. 8,554,464.*

* cited by examiner

*Primary Examiner* — Yogesh C Garg
(74) *Attorney, Agent, or Firm* — Whiteford, Taylor & Preston, LLP; Peter J. Davis

(57) ABSTRACT

Navigation techniques including map based and object recognition based and especially adapted for use in a portable reading machine are described.

30 Claims, 14 Drawing Sheets

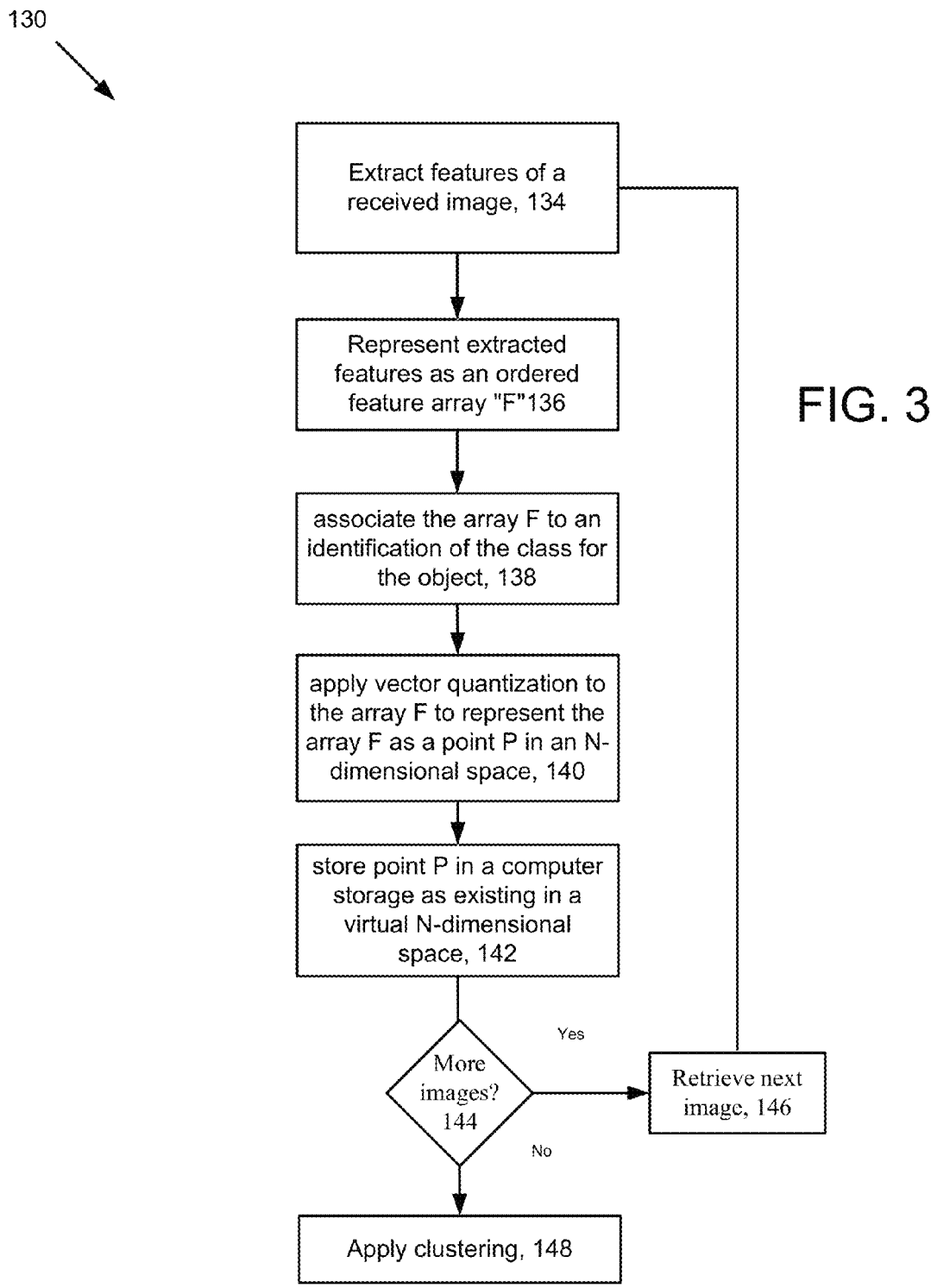

NAVIGATION USING PORTABLE READING MACHINE

This application claims priority under 35 U.S.C. §120 to application Ser. No. 12/433,846, filed Apr. 30, 2009, which claims priority under 35 U.S.C. §119(e) to provisional U.S. Patent Application 61/049,311, filed on Apr. 30, 2008, the entire contents of which are hereby incorporated by reference.

BACKGROUND

Reading machines use optical character recognition (OCR) and text-to-speech (TTS) i.e., speech synthesis software to read aloud and thus convey printed matter to visually and developmentally impaired individuals. Reading machines read text from books, journals, and so forth.

Reading machines can use commercial off-the-shelf flatbed scanners, a personal computer and the OCR software. Such a reading machine allows a person to open a book and place the book face down on the scanner. The scanner scans a page from the book and the computer with the OCR software processes the image scanned, producing a text file. The text file is read aloud to the user using text-to-speech software.

Reading can be viewed broadly as conveying content of a scene to a user. Reading can use optical mark recognition, face recognition, or any kind of object recognition. A scene can represent contents of an image that is being read. A scene can be a memo or a page of a book, or it can be a door in a hallway of an office building. The types of real-world contexts to "read" include visual elements that are words, symbols or pictures, colors and so forth. In addition, reading machines can include software that a user can use to train a reading machine to recognize objects.

SUMMARY

Described are techniques embodied in devices, methods and computer program products that include capturing images that include physical objects, etc., associating the objects to nodes that correspond to the objects, associating, with the nodes, parameters relating to the objects, generating a construct relating the objects to each another, the objects being related based, at least in part, on the parameters, and using the construct to generate a route among the objects.

One or more aspects may provide one or more of the following advantages.

The techniques provide functionality that allows a user, especially blind and visually impaired users to navigate an environment. When implemented as a reading machine, especially a portable reading machine, this allows a user to use the reading device as navigation device especially adaptable for indoor environments.

The details of one or more embodiments are set forth in the accompanying drawings and the description below. Other features, objects, and advantages will be apparent from the description and drawings, and from the claims.

DESCRIPTION OF DRAWINGS

FIG. 3 is a flow chart of an object recognition training mode.

DETAILED DESCRIPTION

Figure 1:
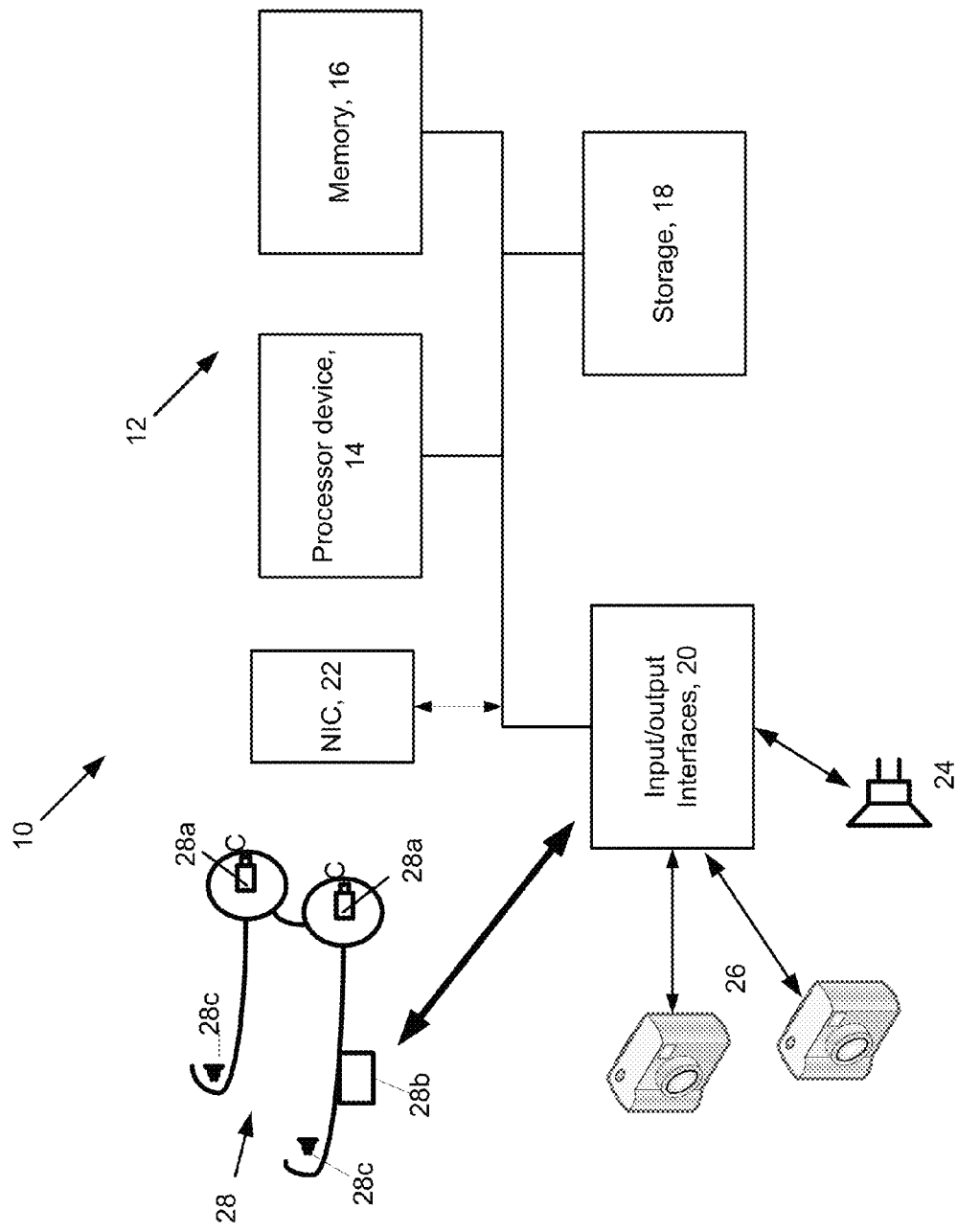
FIG. 1 is a block diagram depicting a typical configuration for a portable reading machine.

Referring to FIG. 1, a configuration of a portable reading machine 10 is shown. The portable reading machine 10 includes a portable computing device 12 and image input device 26, e.g. here two cameras, as shown. Alternatively, the portable reading machine 10 can be a camera with enhanced computing capability and/or that operates at multiple image resolutions. The image input device, e.g. still camera, video camera, portable scanner, collects image data to be transmitted to the processing device. The portable reading machine 10 has the image input device coupled to the computing device 12 using a cable (e.g. USB, Firewire) or using wireless technology (e.g. Wi-Fi, Bluetooth, wireless USB) and so forth. Example configurations include a consumer digital camera coupled to a pocket PC or a handheld Windows or Linux PC, a personal digital assistant, and so forth. The portable reading machine 10 will include various computer programs to provide reading functionality as discussed below.

In general, in FIG. 1, the computing device 12 of the portable reading machine 10 includes at least one processor device 14, memory 16 for executing computer programs and persistent storage 18, e.g., magnetic or optical disk, PROM, flash PROM or ROM and so forth that permanently stores computer programs and other data used by the reading machine 10. In addition, the portable reading machine 10 includes input and output interfaces 20 to interface the processing device to the outside world. The portable reading machine 10 can include a network interface card 22 to interface the reading machine to a network (including the Internet), e.g., to upload programs and/or data used in the reading machine 10.

The portable reading machine 10 includes an audio output device 24 to convey synthesized speech to the user from various ways of operating the reading machine. The camera and audio devices can be coupled to the computing device using a cable (e.g. USB, Firewire) or using wireless technology (e.g. Wi-Fi, Bluetooth) etc.

The portable reading machine 10 may have two cameras, or video input devices 26, one for high resolution and the other for lower resolution images. The lower resolution camera may support lower resolution scanning for capturing gestures or directed reading, as discussed below. Alternatively, the portable reading machine may have one camera capable of a variety of resolutions and image capture rates that serves both functions. The portable reading machine can be used with a pair of "eyeglasses" 28. The eyeglasses 28 may be integrated with one or more cameras 28a and coupled to the portable reading machine, via a communications link. The eyeglasses 26 provide flexibility to the user.

The communications link 28b between the eyeglasses and the portable reading machine can be wireless or via a cable, as discussed above. The reading glasses 28 can have integrated speakers or earphones 28c to allow the user to hear the audio output of the portable reading machine. The reading machine 10 includes image stabilization, zoom, image preprocessing, and image and text alignment functions, as generally discussed below.

A tablet PC and remote camera could be used with computing device 12 to provide another embodiment of the portable reading machine 10. The portable reading machine 10 can be implemented as a handheld camera with input and output controls.

The portable reading machine 10 can also be implemented as a mobile telephone, e.g., so-called smart phones such as the Nokia N95 (Nokia, Inc.) having an image input device and enhanced computing resources. Such a smart phone can be modified to have the computing resources execute application software that implements reading machine functionality (discussed below).

Figure 2:
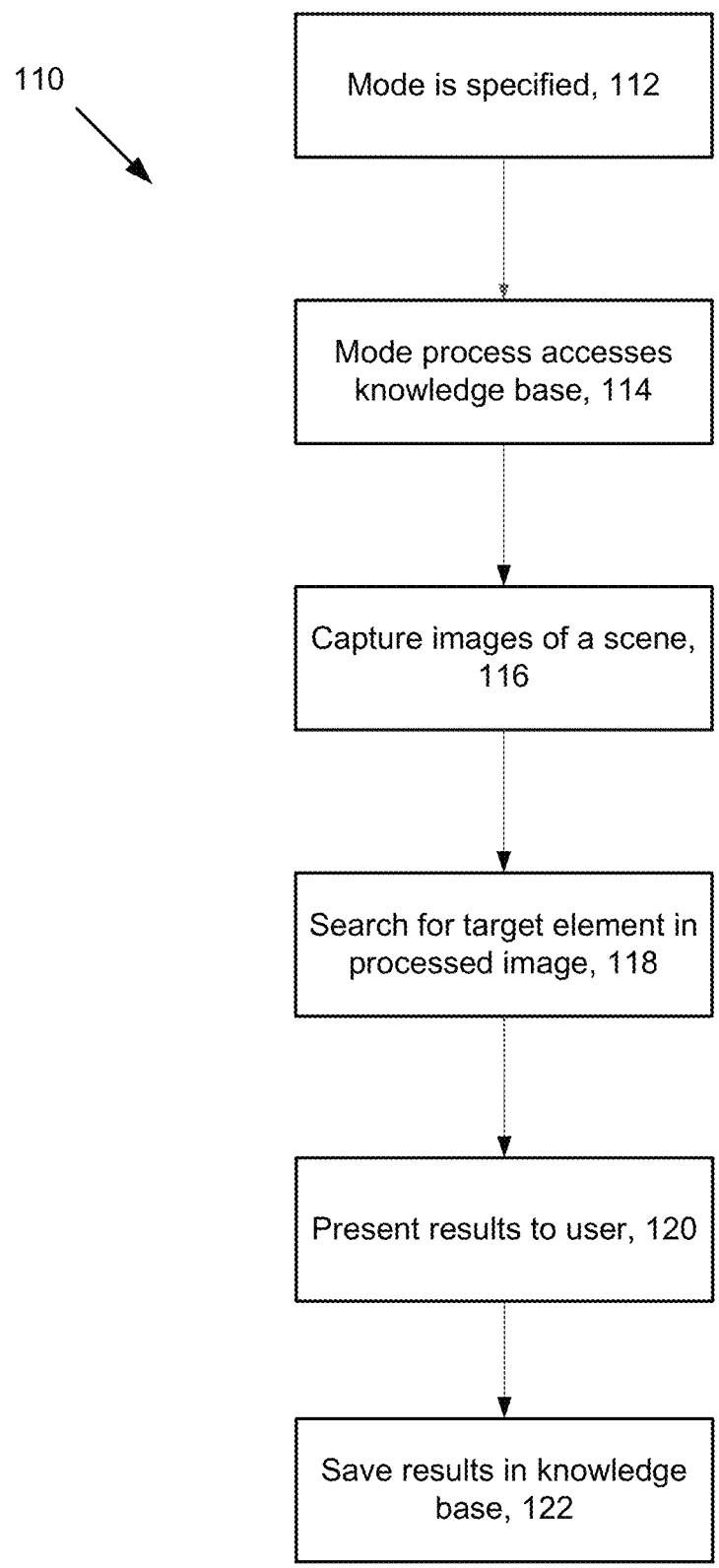
FIG. 2 is a flow chart depicting operating overview of the reading machine.

Referring to FIG. 2, a process 110 for operating the reading machine is shown. Various modes (112, 114) can be incorporated in the reading machine, as discussed in U.S. Published application Ser. No. 11/097,956, filed Apr. 1, 2005, assigned publication no. US 2005-0286743 A1, and entitled: "Portable Optical Reader for the Blind", which is incorporated herein by reference in its entirety.

The reading machine captures 116 one or several images of a scene and processes the image to identify 118 one or more target elements in the scene using information obtained from the knowledge base. An example of a target element is a number on a door or an exit sign. Upon completion of processing of the image, the reading machine presents 120 results to a user. Results can be presented in various ways, but generally as speech or other output to convey information to the user. In some embodiments, the reading machine processes the image(s) using more than one mode and presents the result to a user based on an assessment of which mode provided valid results.

The modes can incorporate a "learning" feature so that the user can save 122 information from processing a scene, so that the same context is processed easier the next time.

OBJECT RECOGNITION

The reading machine can include software that allows a user to train the reading machine to recognize everyday objects in the user's environment. Generally, due to various limitations such as the availability of memory and processing speed, such object recognition would be limited to a relatively few objects and indeed may not be able to recognize different objects that are of the class as those objects recognized. For instance, with a user's training a reading machine using pattern matching based on defined templates, as disclosed in the above mentioned application, it may be possible to allow the user to train the reading machine to recognize the user's dog, but it would be less likely that the reading machine could recognize a different breed of dog based on the user-defined templates used to recognize the user's dog. Published Application US 2005-0286743 A1 mentioned above describes various template based object recognition techniques.

Generalized Object Recognition

The reading machine 10 also includes a more generalized object recognition process, as will now be described. This generalized object recognition is based on training an algorithm using many different images of objects and constructing a compressed set of data to represent features of many examples of many objects. One source of images could be the Internet, whereas other sources could be used.

Figure 3A:
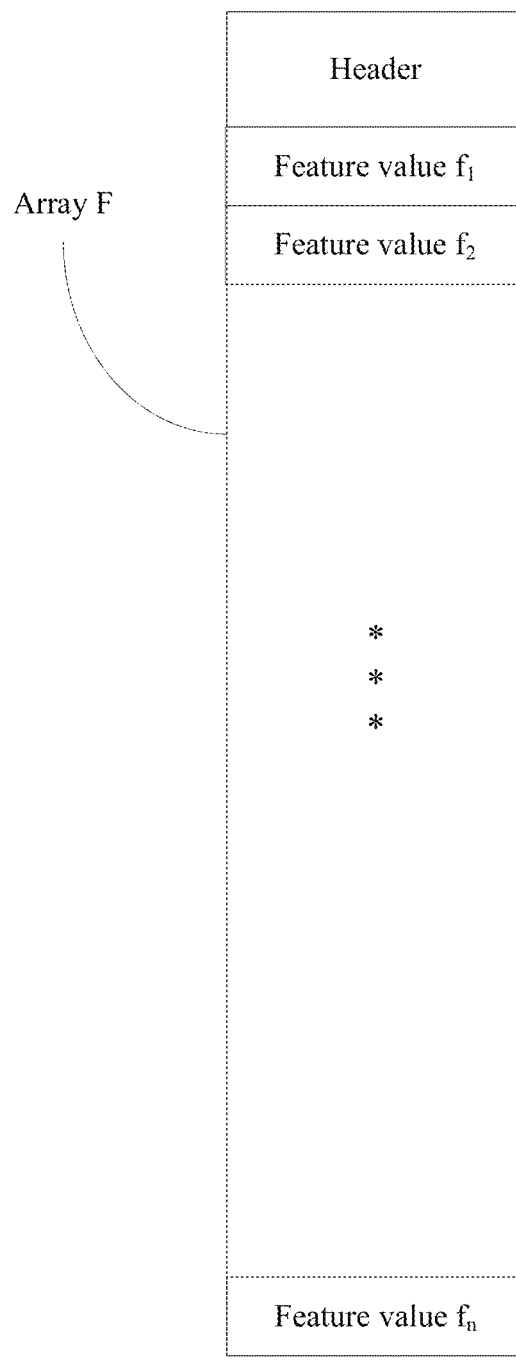
FIG. 3A is a diagram depicting an ordered feature array.
Figure 3B:
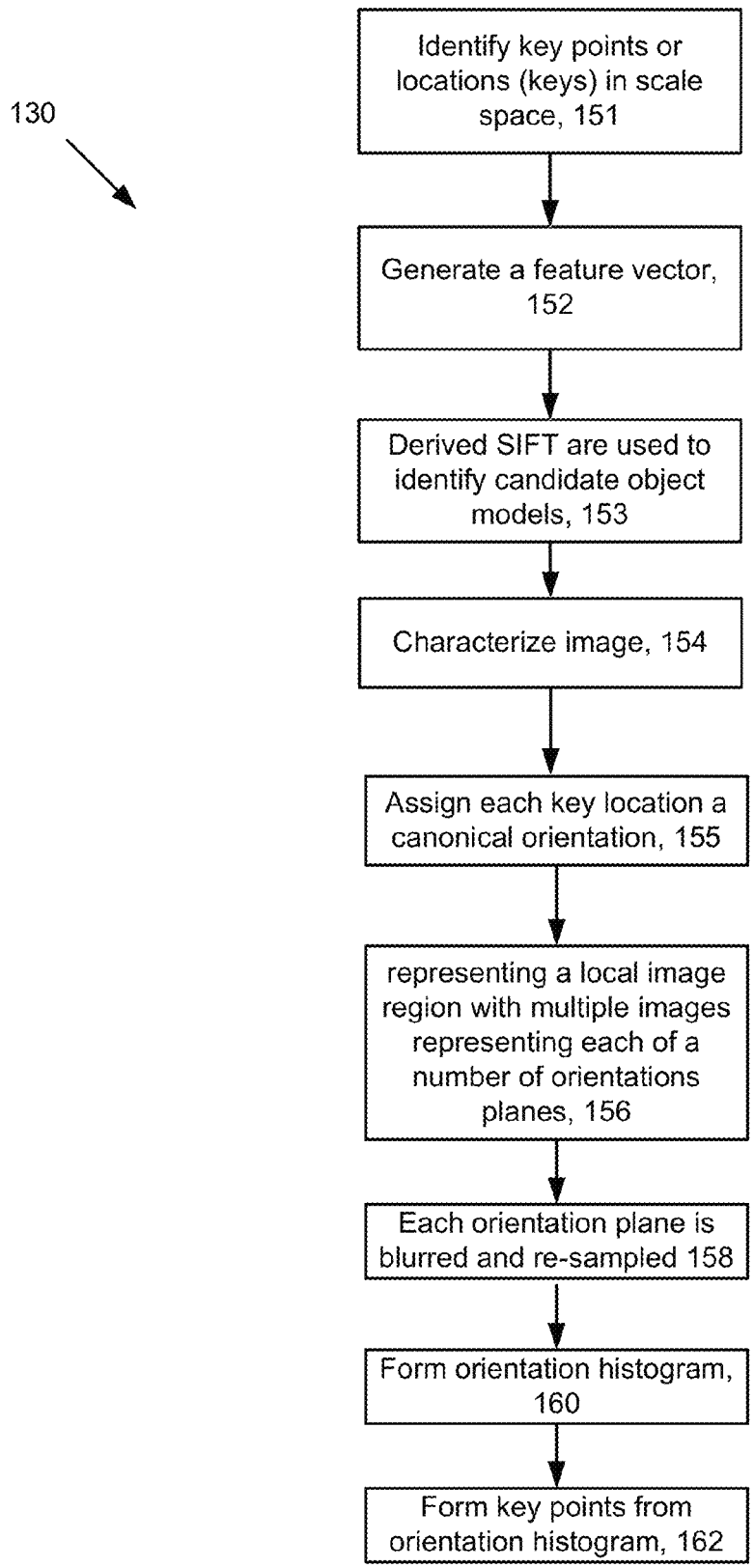
FIG. 3B is a flow chart.

Referring to FIG. 3, an object recognition training mode 130 is provided. Due to the complexity of processing and data storage in the object recognition training mode 130, it is preferred that the object recognition training mode 130 is run as an off-line process that produces data that is either built-into reading machines, downloaded to reading machines, supplied via a memory card, etc. to enable reading machines to recognize various classes of objects in conjunction with a generalized object recognition application discussed below.

In order to recognize various classes of objects, the training mode 130 examines a large number of examples of objects for each class. Thus, for instance, if it was desired to have the reading machine recognize fifty (50) different classes of objects, it may be necessary to develop a database for the reading machine that is based on several hundred or up to one or two thousand or more examples of objects for each class of object, and thus upwards of e.g., 10,000 or more examples of objects for 50 classes of objects. The examples are in the form of images of different object examples for each class of objects.

As used herein "object" refers to examples of "things" that are used to develop the database. For instance, objects can be different breeds of dogs or different dogs within a particular breed. "Class," on the other hand, will refer to the general classification of the things or objects that are used during training mode. For instance, class would refer to the class of objects that are "dogs," whereas objects are the individual examples of "dogs." Class can have fine or coarse granularity. Thus, while the process below is described using different dogs as objects for the class "dogs" and different cats as objects for the class "cats," the class can be more granular. Thus, another application could train based on "breeds of dogs" and "breeds of cats" using images of a particular breed for training for the particular breed of the breed of dogs class, providing a sub-class of dogs by breed a super-class of dogs of all breeds etc.

In the training mode 130, for each class, features of a received image are extracted 132 from the image using various recognition techniques. These features are values for lines and curves that are processed from the features extracted from the image. For instance, for dogs, a full body shot of a dog may be used to extract the following features:
Height
Length
Color
Characteristics of the head including
    Distance between eyes
    Distance from base of head to eyes
    Distance from eyes to top of head
    Shape of head
Characteristics of fur, etc.

The training mode normalizes 134 the feature data prior to further processing to account for spatial differences involved in the various images.

For any particular class of objects, each member of the class, e.g., example object, has the extracted features represented 136 as an ordered feature array "F" and associated 138 with the array F is an identification of the class for the object.

The ordered array is depicted in FIG. 3A and includes fields that identify the object, e.g., in a header and fields that correspond to values (e.g., normalized values) of the features extracted from the image. In the header, various data can be stored, such as the identification of the image used to produce the array, the identification of the object the class of the object and so forth. Alternatively, one can separate the identification information from the array itself.

In the value fields $f_1$ to $f_n$ the normalized values of the lengths, curvature etc. for those particular features are stored. In some instances, for a particular image some of the fields of $f_1$ to $f_n$ may be left blank, if for instance a particular feature corresponding to that field is not found in the processed image.

The training mode 130 applies 140 vector quantization to the array F to represent the array F as a point P in an N-dimensional space, where N is equal to the number of features in the features array F.

The training mode 130 stores 142 this point P in a computer storage as existing in a virtual N-dimensional space. The training mode 130 determines 144 if there are more images of objects to process, and thus processes each image of the objects for the class C, producing a point P in N-dimensional space for each object.

After all objects in a class have been processed (or alternatively after all objects in all classes have been processed), the training mode 130 finds/applies 148 groupings or clusters of points P, belonging to the same class.

Figure 4:
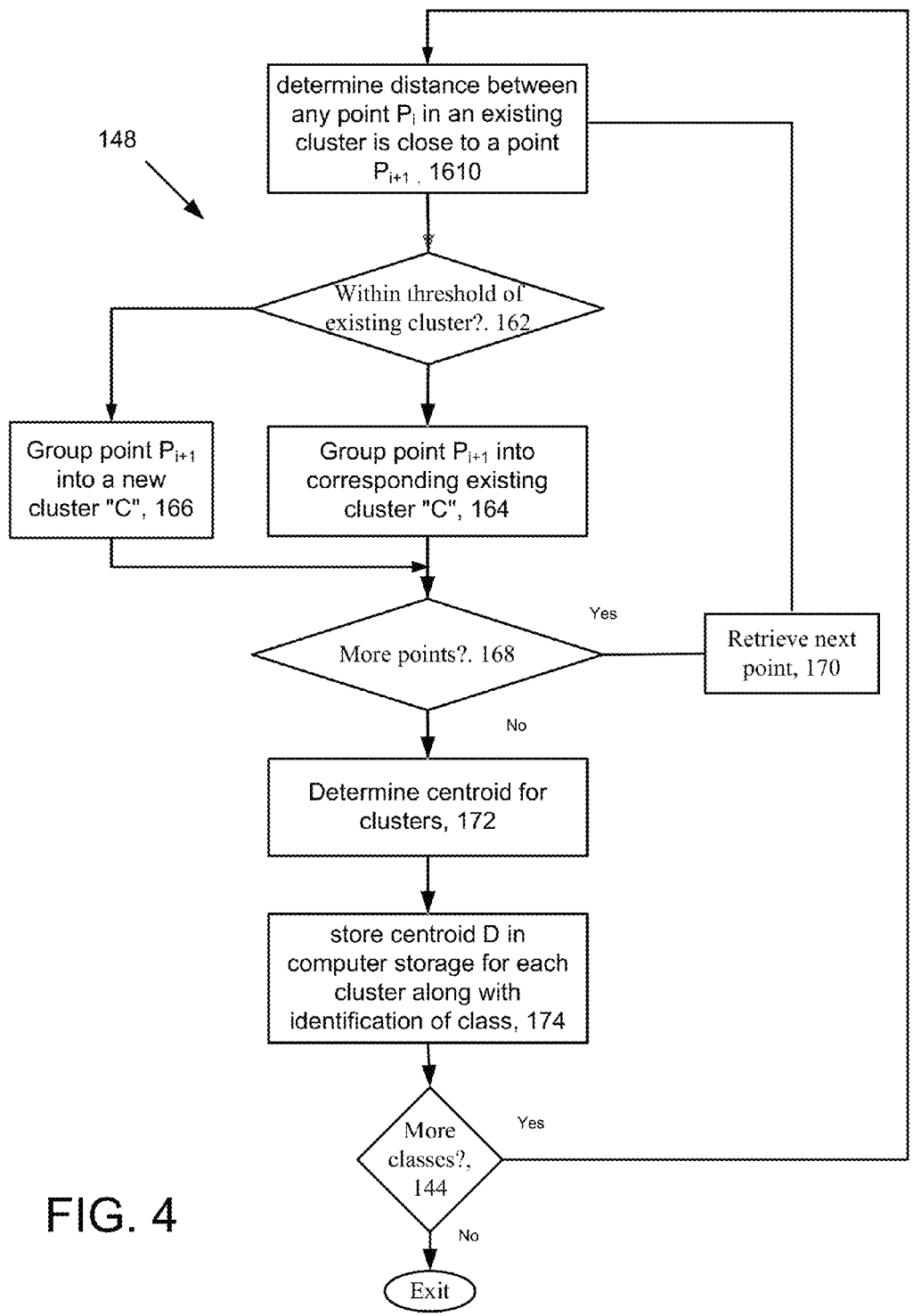
FIG. 4 is a flow chart detailing clustering used in the object recognition training mode.

Referring now to FIG. 4, details on clustering 148 are shown. For a particular point $P_i$ in N-dimensional space, clustering 148 determines 160 whether that point $P_i$ is close to another point $P_{i+1}$ of the same class, by determining the distance between those points as $X=P_{i+1}-P_{i+1}$ in the N-dimensional space and comparing the distance X to a threshold value T.

The clustering algorithm determines the distance X (here in two dimensional space for illustration, but in practice, n-dimensional space) between all of the points and groups them into the clusters provided that the distance X is less than or equal to the threshold value T, and that the class of each point is the same. As an example, the clustering algorithm determines 160 the distance X between a point $P_{i+1}$ and any point in each existing cluster, compares 162 that distance X to the threshold T and determines whether the point $P_{i+1}$ belongs in the existing cluster 164 or whether the point $P_{i+1}$ belongs in a new cluster 166.

The clustering algorithm determines 168 whether there are more points. If so, the clustering algorithm retrieves 170 the next point and continues processing, as shown. On the other hand, if there are not any more points to cluster, the process finds 172 a centroid for each determined cluster. Finding a centroid involves finding a point that best represents the cluster, e.g., is at the center of the cluster or which is clustered around the predominant number of points in the cluster. Clustering techniques as applied in speech recognition can be adapted for the clustering described above.

Thus, the clustering algorithm group points into clusters and, from the clusters, a centroid if found that is used to represent the points and all possible points in the cluster. Each cluster has associated with the cluster an identification of the object type. The centroid "D," is the point P in N-dimensional space, which along with a determined tolerance, variance or standard deviation represents that particular cluster. The centroid D is that point in the cluster (either calculated or an actual point) that is at the center of all of the points in the cluster. The centroid point D, along with the determined tolerance, variance or standard deviation and the identification of the class corresponding to the cluster is stored in a database that is used by the portable reading machine 10. This data along with a recognitions process (discussed below) is loaded onto reading machines to provide a generalized object recognition mode for the reading machines.

Figure 5:
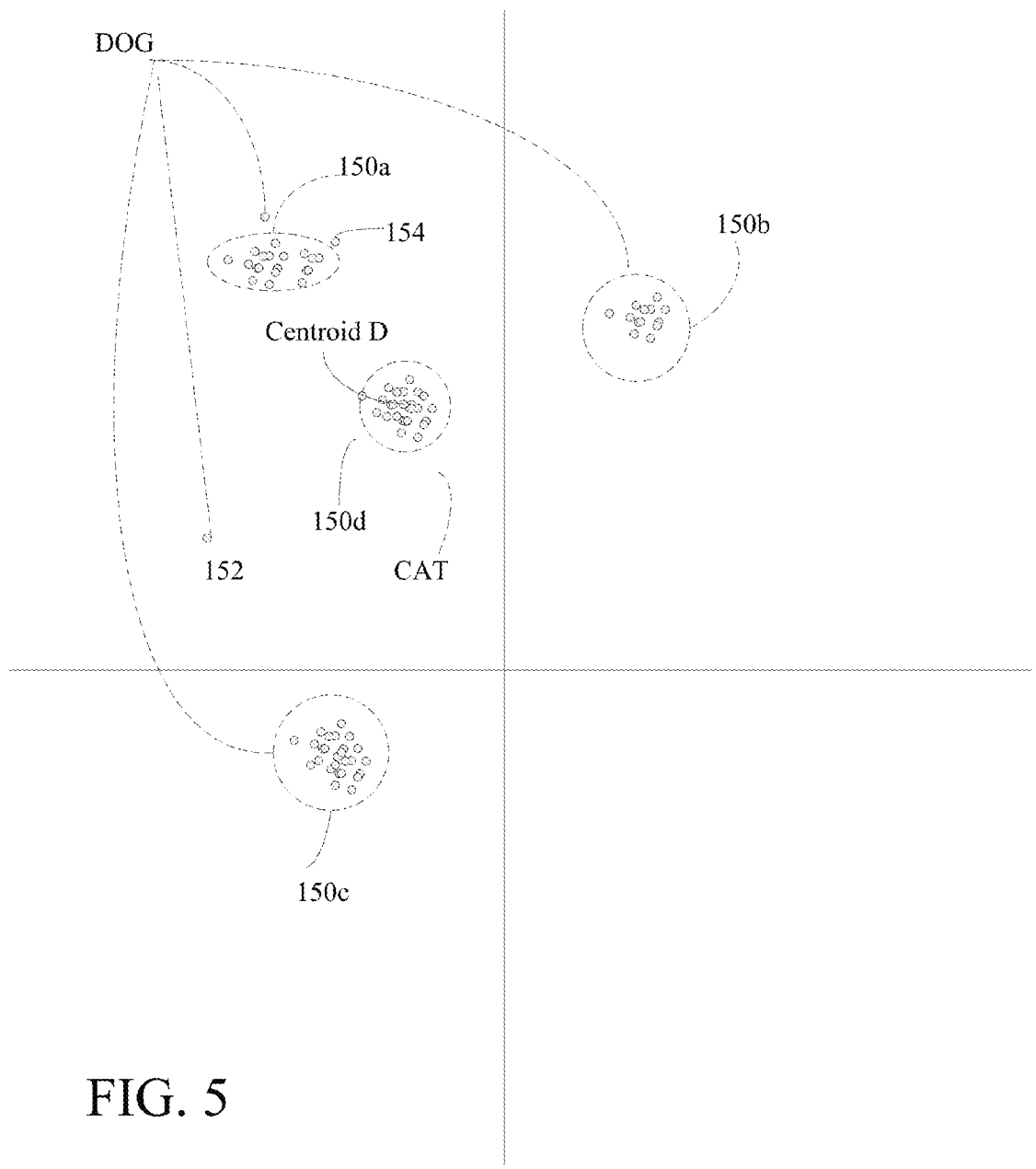
FIG. 5 is a diagram useful for understanding clusters.

Referring now to FIG. 5, there are provided three clusters of "dog" and one cluster of "cats." In this very simplified example in two dimensional space, there are four clusters, 150a-150d, an outlier point 152, and an outliner point 154. In this example, clusters 150a, 150b and 150c represent the class of objects "dogs", whereas cluster 150d represents the class of objects "cats." The outlier point 152 is an example of a dog and the outliner point 154 is an example of the class "cats."

While, the point 154 is close to the cluster of the class "dog," it actually belongs to the class of "cats" but is not included in either cluster dog or cat, since the distance between the point 154 and the nearest point in any of the clusters of "cats" is beyond the threshold "t" for "cats." Similarly, the point 152 is beyond the threshold t for "dog" and is not included in any cluster. Both points 152 and 154 are considered outliers or more correctly, noise in the data, and can be ignored. Accordingly, there can be another requirement for forming clusters, which is that the cluster has a minimum number of members. Generally, that number is determined empirically.

This approach of using a centroid to represent the data is a compression technique that reduces the amount of data that needs to be stored and processed by the portable reading machine 10 in comparison to the ordered arrays used to represent each object in the class. For any given class of objects, e.g., dog, cat, person, signpost, car, etc. there is likely to exist several clusters and hence several centroids, one for each cluster. In addition, after processing of all points in the class, there may be some points that do not fit into any class. These outliners can be considered as noise and can be discarded.

Variations in the grouping are possible. For instance, the process has been described as involving determinations of clusters for each class of objects, sequentially. Thus, as described, a first class of objects are processed, clustered and represented as a centroid and a second class of objects are processed, clustered and represented as a centroid, and so forth. This need not be the case and instead objects from different classes can be processed, clustered and the clusters represented as centroids and the centroids identified by the class.

Figure 6:
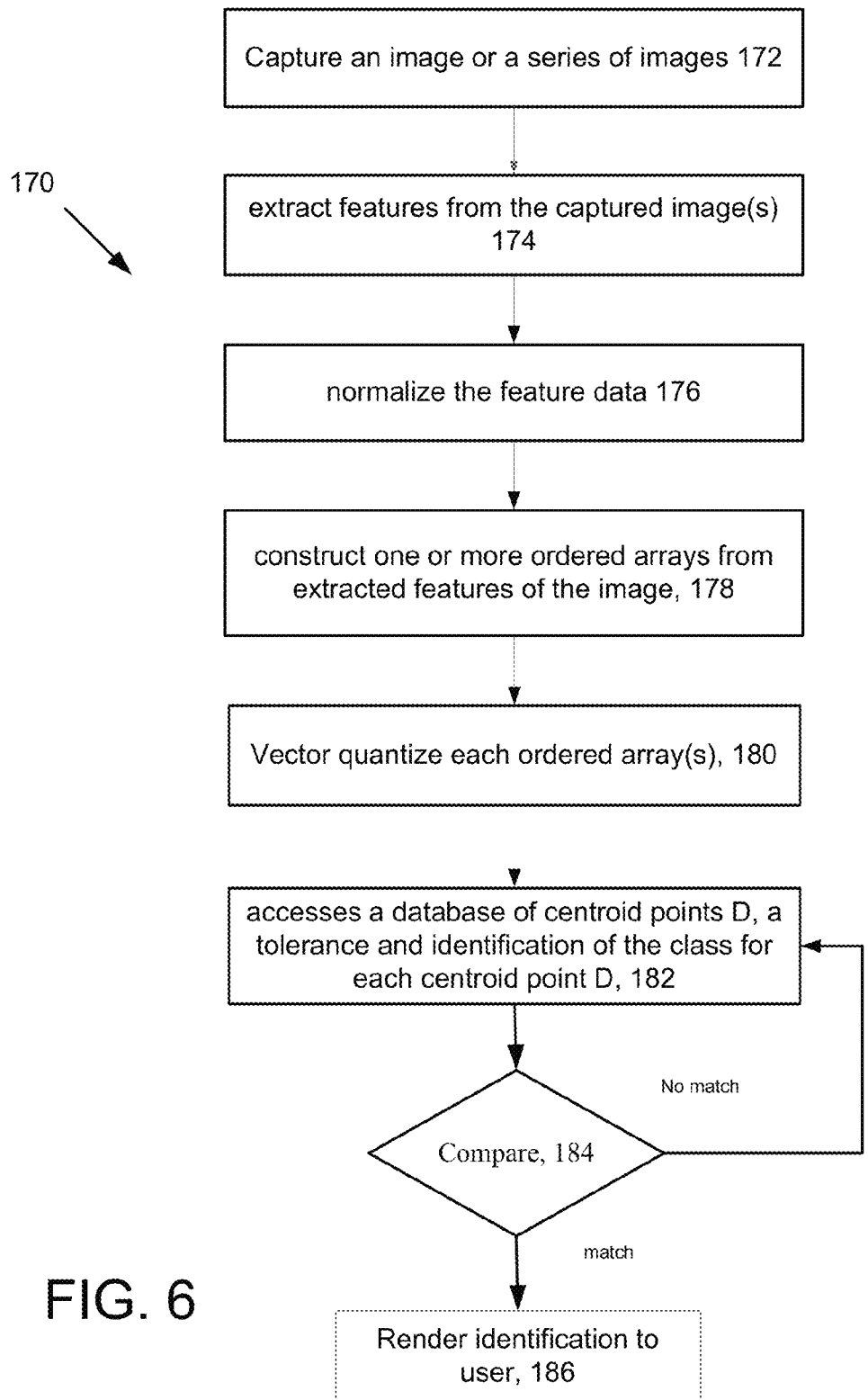
FIG. 6 is a flow chart of generalized object recognition.

Referring to FIG. 6, generalized object recognition 170 is shown. Generalized object recognition 170 applies generalized object recognition in a user's environment and involves recognition of pre-programmed object classes using centroids of clusters to represent objects belonging to a particular class of objects.

In generalized object recognition 170, the portable reading machine 10 captures 172 an image or a series of images and extracts 174 the same features from the captured image(s) as in the feature set used to process classes in the training mode 130.

The portable reading machine 10 normalizes 176 the feature data and constructs 178 one or more ordered arrays from extracted features of the image(s). If multiple arrays are provided, the portable reading machine 10 processes the ordered arrays to provide an array that is an average of the ordered arrays or alternatively. The portable reading machine can use each ordered array in recognition mode to attempt to find a match to one of the pre-processed classes of objects, as discussed below. Other approaches can be used.

In any event, the reading machine 10, after constructing the one or more arrays, vector quantizes the array 180 to provide a point in n-dimensional space for the order array, each ordered array(s) or an averaged ordered array, as the case may be. The vector quantization is performed in a similar manner as discussed above.

After a centroid(s) is determined, the process accesses 182 a database of pre-stored centroid points D, along with a tolerance, (e.g., a standard deviation, variance etc.) and an identification of the class for each centroid point D. This database is typically provided during manufacture of the reading machine, but can be downloaded over a network or loaded via a memory card, etc. so that as new classes of objects are processed, data representing such new classes of objects can be loaded into the machine 10.

The pre-stored centroid data are compared 184 to the point(s) in n-dimensional space determined above to find one (or more) matches. If there is a match the identification for that cluster represented by the matching centroid for that cluster is retrieved and the identification is rendered 186 to the user, for instance text corresponding to the result can be fed to text to speech synthesis software to allow the reading machine 10 to convey the identification to the user, via audio output.

On the other hand, if more than one match is provided, then the reading machine can provide the best match (e.g., by the minimum distance from the determined point and the retrieved matching centroids), and retrieve the identification of the best matching class or convey to the user all of the matching classes found.

If no match is found, the next centroid is retrieved to determine whether there exists a match to the determined point or point(s) if multiple arrays were quantized into multiple points in n-dimensional space.

Image Adjusting

Figure 7:
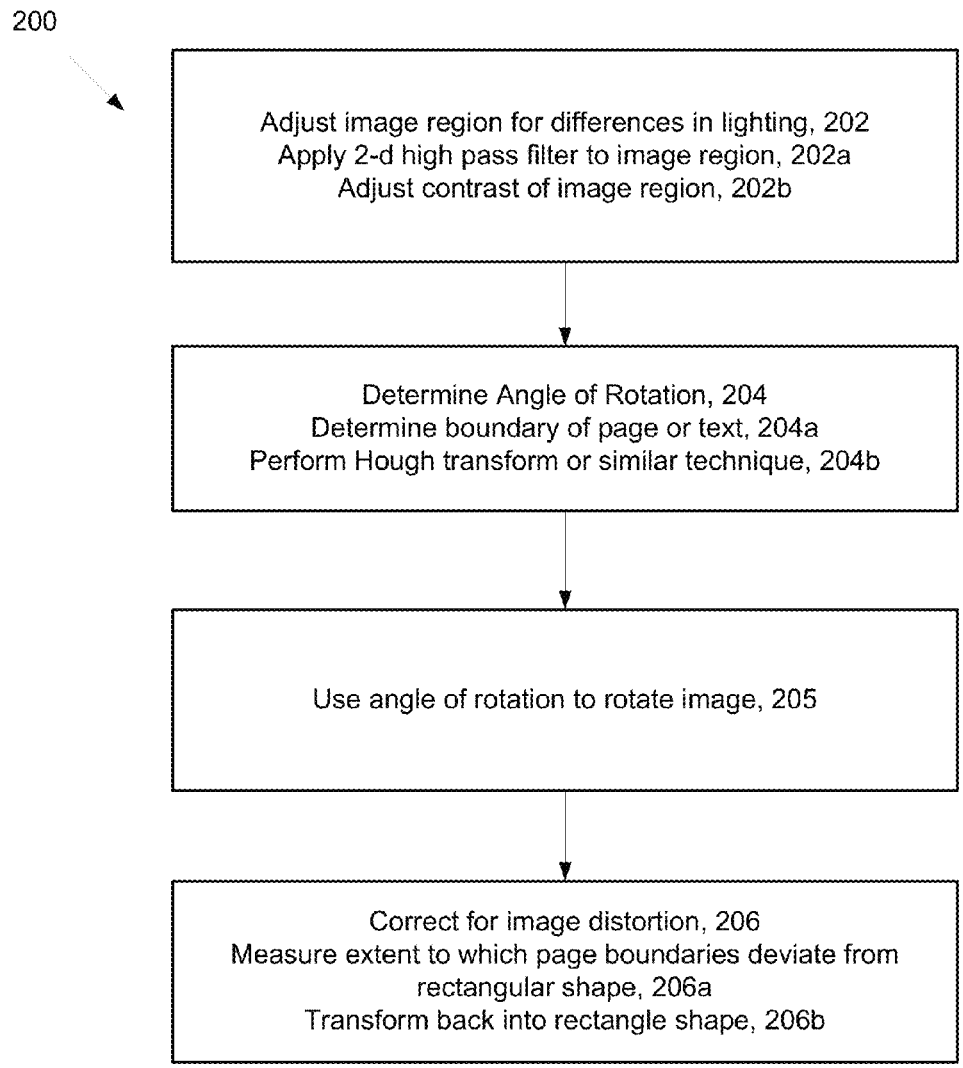
FIGS. 7 and 8 depict various image adjusting techniques.

Referring to FIG. 7, various image adjusting techniques 200 are applied to the image. For example, OCR algorithms typically require input images to be monochromatic. In order to preserve the relevant text information, the process of converting the raw image to a form suitable for OCR usually requires that the image be auto-balanced to produce more uniform brightness and contrast. Rather than auto-balance the entire image as one, the portable reading machine may implement an auto-balancing algorithm that allows different regions of the image to be balanced differently 202. This is useful for an image that has uneven lighting or shadows. An effective technique of removing regional differences in the lighting intensity is to apply 202a a 2-dimensional high pass filter to the color values of the image (converting each pixel into black or white), and apply 202b a regional contrast enhancement that adjusts the contrast based on determined regional distribution of the intensity.

Image rotation can improve the reading of a page by the OCR software. The entire page can be rotated, or just the text, or just a section of the text. The angle of rotation needed to align the text may be determined 204 by several techniques. The boundaries of the page or text determine 204a the angle of rotation needed. The page boundaries may be determined by performing edge detection on the page. For text, it may be most useful to look at the top and bottom edges to determine the angle.

The angle of rotation can also be determined using a Hough transform or similar techniques 204b that project an image onto an axis at a given angle (discussed in more detail below). Once the angle of rotation has been determined, the image can be rotated 205.

The portable reading machine may correct 206 for distortion in the page if the camera is tilted with respect to the page. This distortion is detected 206a by measuring the extent to which the page boundaries deviate from a simple rectangular shape. The portable reading machine corrects 206b for optical distortion by transforming the image to restore the page to a rectangular shape.

Camera Tilt

Figure 8:
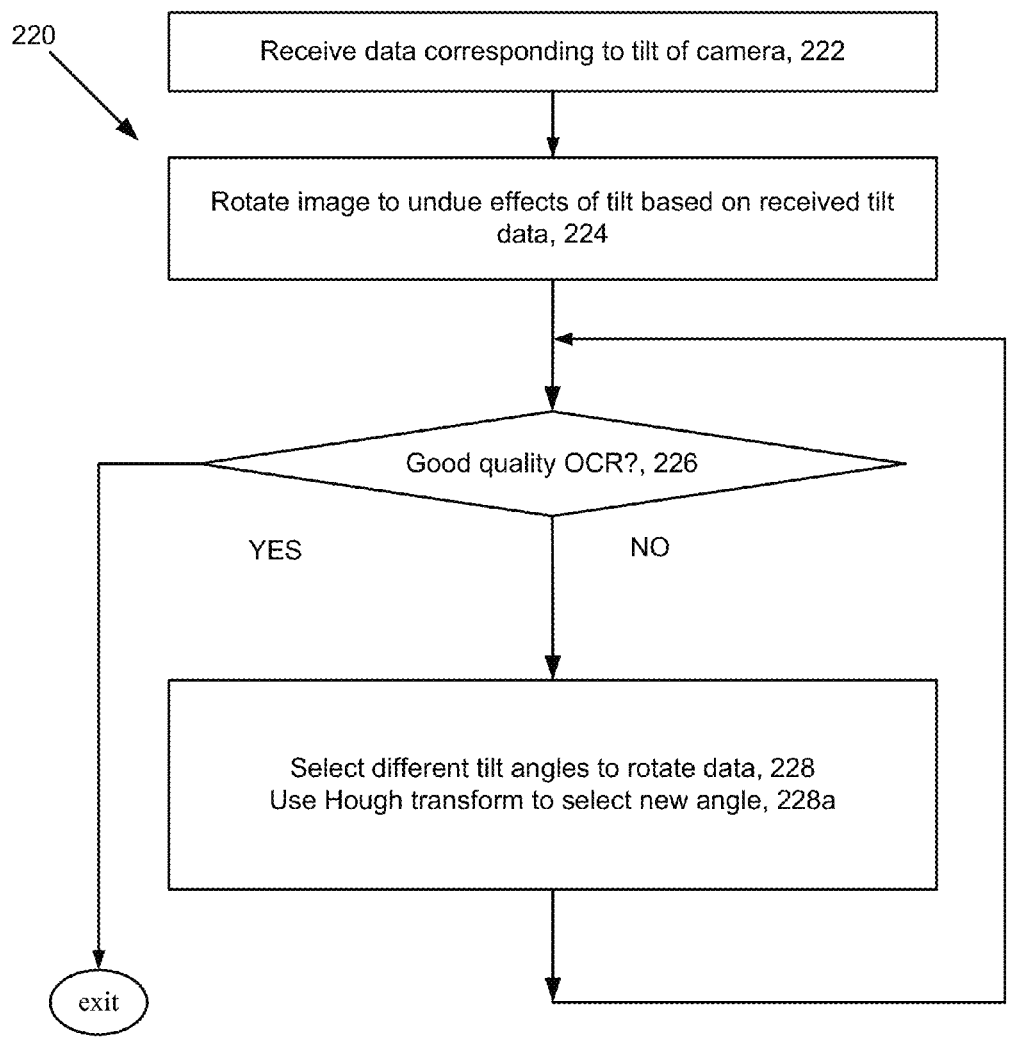

Referring to FIG. 8, the portable reading machine incorporates sensors to measure the side-to-side and front-to-back tilt of the camera relative to the vertical. This information may be incorporated into a tilt adjustment process 220 for the image rotation determination process 204, discussed above.

The portable reader receives 222 data from sensors corresponding to the tilt of the camera and rotates 224 the image to undo the effect of the tilt. For example, if the portable reading machine takes a picture of a door with sign on it, and the camera is tilted 20 degrees to the left, the image taken by the portable reading machine contains text tilted at 20 degrees. Many OCR algorithms may not detect text at a tilt angle of 20 degrees; hence, the sign is likely to be read poorly, if at all. In order to compensate for the limitations of the OCR algorithms, the portable reading machine 10 mathematically rotates the image and processes the rotated image using the OCR. The portable reading machine uses the determined tilt data as a first approximation for the angle that might yield the best results. The portable reading machine receives 226 a quality factor that is the number of words recognized by the OCR. The number of words can be determined in a number of ways, for example, a text file of the words recognized can be fed to a dictionary process (not shown) to see how many of them are found in the dictionary. In general, if that data does not yield adequate results, the portable reading machine can select 228 different rotation angles and determine 226 which one yields the most coherent text.

A measurement of tilt is useful, but it is usually augmented by other strategies. For example, when reading a memo on a desk, the memo may not be properly rotated in the field of view to allow accurate OCR. The reading machine can attempt to estimate the rotation by several methods. It can perform edge detection on the image, looking for edge transitions at different angles. The largest of the detected edges are likely to be related to the boundaries of the memo page; hence, their angle in the image provides a good clue as to what rotation of the page might yield successful OCR.

Selecting the best rotation angle can be determined using the Hough transform or similar techniques 228a. These techniques examine a projection of the image onto an axis at a given angle. For purposes of this explanation, assume the color of the text in an image corresponds to a value of 1 and the background color corresponds to a value of 0. When the axis is perpendicular to the orientation of the text, the projection yields a graph that that is has periodic amplitude fluctuations, with the peaks corresponding to lines of text and the valleys corresponding to the gaps between. When the axis is parallel to the lines of text, the resulting graph is smoother. Finding the angles that yield a high amplitude periodicity, one can provide a good estimate for an angle that is likely to yield good OCR results. The spatial frequency of the periodicity gives the line spacing, and is likely to be a good indicator of the font size, which is one of the factors that determine the performance of an OCR algorithm.

Object Re-Sizing

One of the difficulties in dealing with real-world information is that the object in question can appear as a small part of an image or as a dominant element of an image. To deal with this, the image is processed at different levels of pixel resolution. For example, consider text processing. Text can occur in an object in variety of font sizes. For example, commercially available OCR software packages will recognize text in a digitized image if it is approximately 20 to 170 pixels in height.

Physical Navigation Assistance

The portable reading machine 10 can recognize a feature in a scene (e.g. stairs, exit, specific street sign or door number, cat dog, etc.). In one implementation, any feature can be recognized that is preprogrammed using either the template approach discussed in the above incorporated by reference application and/or the generalized approach discussed above. The template based approach can also be used to supplement the object recognition capabilities of the reading machine 10. One method to assist with physical navigation is through speech input. For example, if the user is in a building and looking for an exit, the user may simply speak "find exit" to direct the portable reading machine to look for an item that corresponds to an "exit sign" in the scene and announce the location to the user. This can be done using either the general approach or the template based object recognition or simply OCR on features in a captured image looking for the word "exit."

The usefulness of the portable reading machine 10 in helping the user navigate the physical environment can be augmented in several ways. For instance, the portable reading machine 10 will store, in a knowledge base, a layout of the relevant building or environment. Having this information, the portable reading machine 10 correlates features that it detects in the images to features in its knowledge base. By detecting the features, the portable reading machine 10 helps the user identify his/her location or provide information on the location of exits, elevators, rest rooms, etc. The portable reading machine may incorporate the functionality of a compass to help orient the user and help in navigation. The knowledge base can be template based and/or based on the generalized approach discussed above.

Map-Based Navigation

Another type of navigation is a map based type navigation that includes a database that stores images of landmarks, descriptions of items and navigation instructions. A program is trained on the images involved in the database.

A user, typically a sighted user, captures an image or a series of images of landmarks in a region that is sought to be mapped. For instance, in an office setting, images will be captured for various landmarks in the office (e.g., corridor, kitchen, conference rooms, offices, etc.) and for various objects in the office (e.g., desks, chairs, water coolers, and so forth). Descriptions of each portion of the office and each object are stored with or associated with each of the identified landmarks. Training the database, it is only required to use live video (no new pictures) to navigate the environment by hearing the description that was generated for every landmark (corridor, kitchen, object X, office Y).

Another application can produce maps of different places (offices, houses, malls, grocery stores, etc.), which can be updated by anybody and downloaded through the Internet. These maps include pictures, tags to identify and search the pictures, and a "navigation description of each landmark", such as:

"walk 10 feet to John's office or turn right to go to the kitchen".

"Starbucks is on your right. Taste our new Colombian coffee".

The description could be text that is converted to speech, or a pre-recorded instruction. A navigation application (which may be run by portable reading machine 10) should permit the user to search the maps and landmarks, and plan a navigation path depending on the landmark it sees and the place the user wants to go to. The navigation application is also configured to tell the user which objects or landmarks are present along the planned path. The application is configured to provide the user an option for deciding where to go next by showing which options are available (even on the screen). The user could press a button and toggle between the options ("kitchen on your right"; "walk 10 feet forward to the entrance"; "office X on your left").

The application could load independent maps. This will reduce the amount of images that are on the same database, making the recognition faster and more accurate.

The navigation application does not need to be part of a reading machine. It could be a separate application running on a portable device such as a small portable computer, a PDA, or a mobile phone. The application could be coupled with a GPS application which detects the place in which the user has arrived—by car—, and automatically loads the indoor navigation map of the same place.

Navigation by Generalized Object Recognition

Generalized object recognition for "indoor navigation" can be particularly adaptable for a new environment or a known environment such as a user's house.

The user may cause the reading machine to capture a picture, e.g., an image of different static locations and train the system with those locations, much the same way that the training mode processed images of different objects. Each location is represented as an n-dimensional point in n-dimensional space and is linked to a set of spoken instructions (e.g. way, mp3, or TTS file formats) that are used to guide the person in navigation. For example, a particular location in a hallway would be one location that is represented by a point. When recognized by the system, since a captured image would be processed to provide the set of instruction, the system will announce: "Turn left to go to X direction, or turn right to go to Y direction". Each new location would have a new set of instructions.

Figure 9:
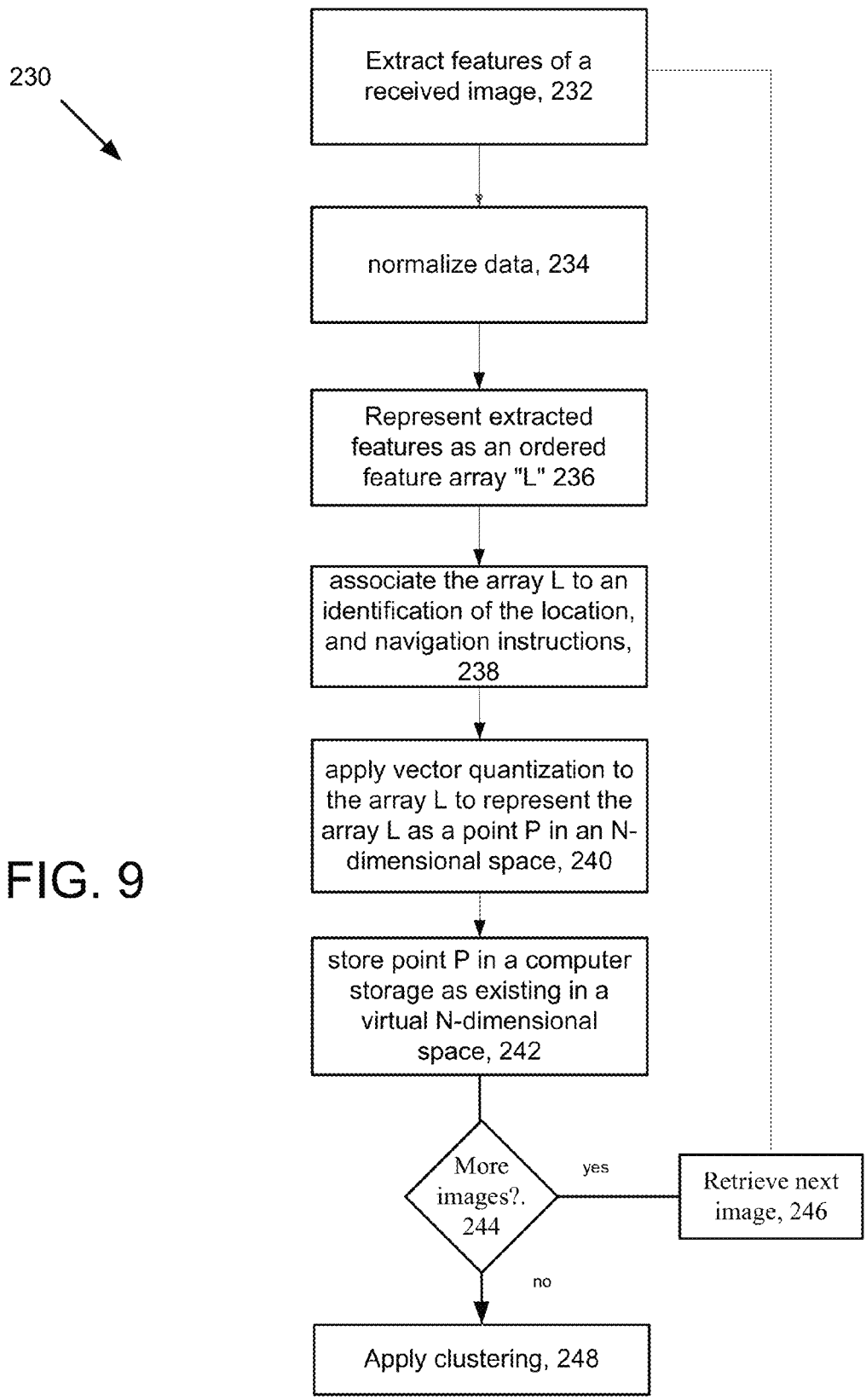
FIG. 9 depicts generalized location recognition training.

Referring to FIG. 9, a location recognition training mode 230 is shown. Due to the complexity of location recognition training mode 130, it may be preferred that the object recognition training mode 130 is run as an off-line process that produces data that is either built-into the reading machine, downloaded to the reading machine, supplied via a memory card, etc. to enable the reading machine to recognize various classes of objects in conjunction with a generalized object recognition application discussed below. However, in other embodiments of a reading machine 10, it could be a mode that is trained on the reading machine directly.

The training mode 230 examines a large number of examples of a particular location. The process 230 develops a database for the reading machine that is based on many example images for each location, in a similar many as discussed above. In some embodiments only a single image may be needed.

In the training mode 230, for each location, features of a received image are extracted 232 from the image using various recognition techniques. These features are values for lines and curves that are processed from the features extracted from the image. The training mode normalizes 234 the extracted data prior to further processing to account for spatial differences involved in capturing the various images.

Each example for each particular location has the extracted features represented 236 as an ordered feature array "L" and associated 238, with the array L, is an identification of the particular location and instructions for navigation from that point to the next point(s) that will be encountered during navigation from that particular location.

The training mode 230 applies 240 vector quantization to the array L to represent the array L as a point P in an N-dimensional space, where N is equal to the number of features in the features array L. The training mode 230 stores 242 this point P in computer storage as existing in a virtual N-dimensional space. The training mode 230 determines 244 if there are more images of examples of a location to process, and processes each example image of the particular location, producing a point P in N-dimensional space for each example.

After all example locations in a particular location have been processed (or alternatively after all locations have been processed), the training mode 230 finds 248 groupings or clusters of points P, belonging to the same class. When using a single image for location, this step is not necessary.

The clustering 248 is similar to the clustering described in FIG. 4. That is, for a particular point $P_i$ in N-dimensional space, the clustering 248 determines whether that point $P_i$ is close to another point $P_{i+1}$ of the same location, by determining the distance between those points as $P_{i+1}-P_{i+1}$ in the N-dimensional space and comparing the distance to a threshold value. Thus, as described in FIG. 4, the clustering 248 groups the examples into clusters of locations, and as described in FIG. 5, centroids are determined for each of those location clusters.

Figure 10:
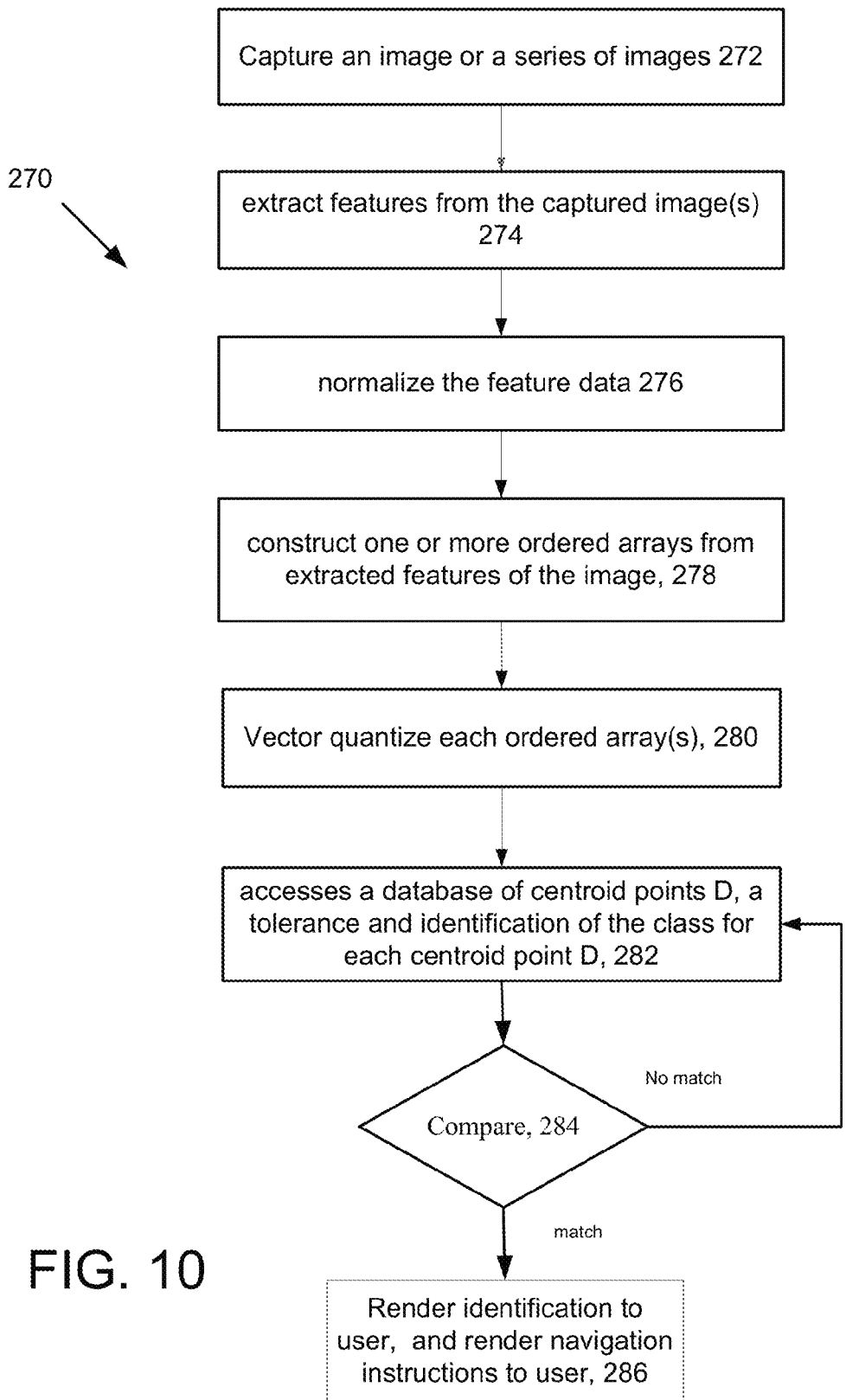
FIG. 10 depicts generalized location recognition.

Referring to FIG. 10, generalized navigation recognition 270 is shown. The generalized navigation recognition 270 uses the generalized location recognition in a user's environment and involves recognition of pre-programmed locations using centroids of clusters to represent location examples belonging to a particular location.

In generalized navigation 270, the portable reading machine 10 captures 272 an image or a series of images and extracts 274 the same types of features from the captured image(s) as in the feature set used to process classes in the training mode 230.

The portable reading machine 10 normalizes 276 the feature data and constructs 278 one or more ordered arrays from extracted features of the image(s). If multiple arrays are provided, the portable reading machine 10 processes the ordered arrays to provide an array that is an average of the ordered arrays or alternatively, the portable reading machine can use each ordered array in recognition mode to attempt to find a match to one of the pre-processed locations, as discussed below. Other approaches can be used.

In any event, the reading machine 10, after constructing the one or more arrays, vector quantizes 280 the array to provide a point in n-dimensional space for the ordered array, each ordered array(s) or an averaged ordered array, as the case may be. The vector quantization 280 is performed in a similar manner, as discussed above.

After the point is determined, the process accesses 282 a database of pre-stored centroid points D, along with a tolerance, (e.g., a standard deviation, variance etc.) and an identification of the class for each centroid point D and navigation instructions that are used for further navigation from that location represented by the point to one of several possible new locations.

The pre-stored centroid data (or points if single images were used to train) are compared 284 to the point(s) in n-dimensional space determined above to find one (or more) matches. If there is a match, the identification for that cluster represented by the matching centroid for that cluster is retrieved and the identification is rendered 186 to the user along with the retrieved navigation instructions. Text corresponding to the results is fed to text to speech synthesis software to allow the reading machine 10 to convey the identification of the location and the instructions for further navigation to the next point to the user, via audio output.

On the other hand if more than one match is provided, then the reading machine can provide the best match (e.g., by the minimum distance from the determined point and the retrieved matching centroids), and retrieve the identification of the best matching class or can convey to the user all of the matching classes found.

If no match is found, the next centroid is retrieved to determine whether there exists a match to the determined point or point(s) if multiple arrays were quantized into multiple points in n-dimensional space.

In this manner, users navigate through different environments as sighted people do by observing landmarks. The technique could be applied to outdoor environments as well (e.g. bus stops, stores, etc).

Creating a Navigation Map

The following describes examples of processes for creating navigation maps using graphs. A navigation map includes, e.g., a path between a starting point and an ending point. The processes described herein may be used with the system of FIG. 1 (including portable reading machine 10) or any variant thereof. The following processes may also be used with systems other than those described herein. Reference to "system" in the following text includes, but is not limited to, portable reading machine 10.

A graph is a data structure that includes a set of nodes and a set of edges that establish relationships (connections) between the nodes. A graph G may be defined as follows: G=(V,E), where V is a finite, non-empty set of vertices and E is a set of edges (links between pairs of vertices). When the edges in a graph have no direction, the graph is called undirected, otherwise it is called directed. Information may be associated with each node and edge of the graph.

Figure 11:
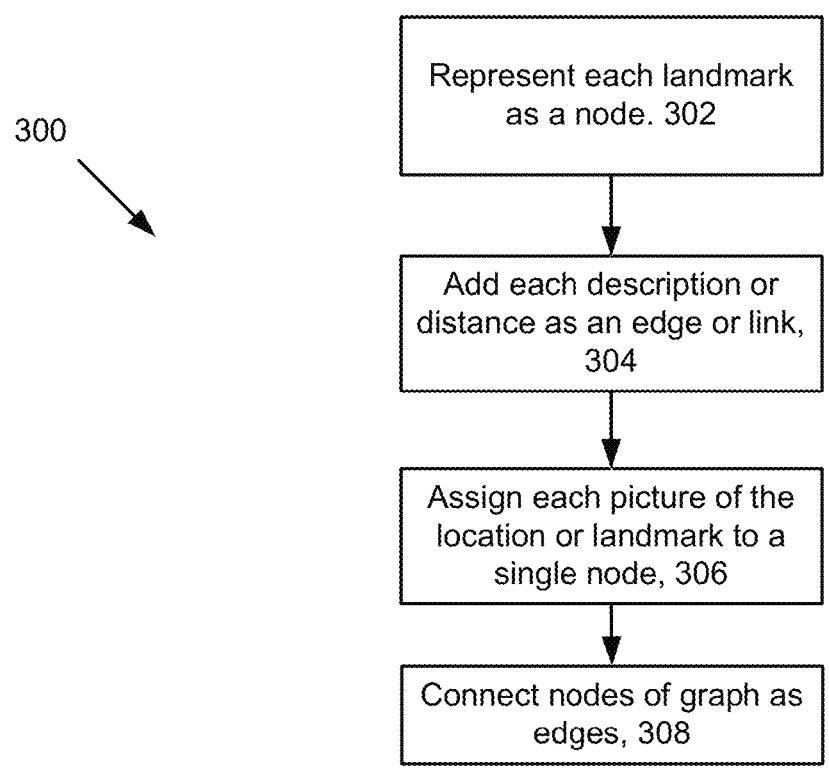
FIG. 11 is a flow chart depicting map based indoor navigation.

Referring now to FIG. 11, in the navigation technique 300 each location or landmark is represented 302 as a node or vertex of a graph, and each description or distance between two points is represented 304 as an edge or link between the nodes. As such, the navigation map is represented as a directed graph that is ordered and can be searched.

Once each picture (of the location or landmark) is assigned 306 to a single node on the graph, the nodes of the graph are connected 308 with edges. These edges, in this example, correspond to relationships between the landmarks (e.g., the kitchen is next to the office). Each edge may also contain information about connectedness to other nodes (e.g., the kitchen is on the office's right), and information about proximity of the two nodes (e.g., the kitchen is 5 feet away from the office). Since each node generally has one or more edges that connect to one or more nodes, a description of the relationship between nodes, such as navigation instructions, can be obtained by accessing a construct, such as a data structure, that stores the information defining the relationships among nodes.

Although the concepts described herein can be used in any environment (outdoor or indoor), they are particularly applicable to indoor environments. In this regard, since one would normally navigate through an indoor environment regardless of orientation, it is desirable to include (at least for most of the nodes) two different edges. The edges include generally different directions or descriptions that connect the same pair of nodes.

A graph that represents a navigation map may include multiple layers. Other layers could be used to represent locations of other objects that could be encountered (e.g., a plant, a chair, a refrigerator, etc) throughout the environment. These objects may also be treated as nodes; however, their edges may or may not contain navigation instructions. These objects may also only be accessed from a parent node (the landmark from which an object can be found). That is, the object has connectedness to the space in which it is placed (e.g., the refrigerator is only inside the kitchen). Generally the edges will include descriptions about the objects themselves.

Having multiple layers for children nodes (objects) on the graph, and keeping a local picture database that is only accessed by the parent node provides several benefits. These benefits include, but are not limited to, the following:
- searching time may be less since it is not necessary to look at an entire picture database,
- the system may be less prone to false positive errors, since the system need not compare between pictures that are not found in the landmark database, and
- an object database can be treated as an independent picture database and, as such, may have different characteristics and metrics.

Graph-Theoretic Data Structures

There are different ways to store graphs in a computer system. The data structure used depends on both the graph structure and the algorithm used for manipulating the graph. Theoretically, one can distinguish between list and matrix structures. But, in applications, the optimal structure may be a combination of both. List structures are often preferred for sparse graphs, since they require less memory. Matrix structures, on the other, hand provide faster access for some applications, but can consume larger amounts of memory than list structures.

Different types of list structures may be used with the processes described herein. These structures include, but are not limited to the following:
- Incidence list: Edges are represented by an array containing pairs (ordered if directed) of vertices (that the edge connects) and possibly weight and other data (e.g., distances between nodes, coordinates, description, etc).
- Adjacency list: Similar to the incidence list in that each vertex has a list of which vertices to which it is adjacent. This causes redundancy in an undirected graph. For example, if vertices A and B are adjacent, A's adjacency list contains B, while B's list contains A. Adjacency queries can be faster, but such lists may require more storage space.

Different types of matrix structures may be used with the processes described herein. These structures include, but are not limited to the following:
- Incidence matrix: The graph is represented by a matrix of E (edges) by V (vertices), where [edge, vertex] contains the edge's data (simplest case: 1—connected, 0—not connected).
- Adjacency matrix: Includes an N by N matrix, where N is the number of vertices or nodes in the graph. If there is an edge from some vertex x to some vertex y, then the element $M_{x,y}$ is 1, otherwise it is 0. In this configuration, it is relatively easy to use subgraphs, and to reverse graphs, if needed.
- Distance matrix: A symmetric N by N matrix containing an element $M_{x,y}$ which is the length of shortest path between x and y. If there is no such path, $M_{x,y}$=infinity. It can be derived from powers of the Adjacency matrix.

Choices of Representation

Two data structures for the representation of graphs are often used. The first is an adjacency list, and is implemented by representing each node as a data structure that contains a list of all adjacent nodes. The second is an adjacency matrix, in which the rows and columns of a two-dimensional array represent source and destination vertices and entries in the graph indicate whether an edge exists between the vertices. Adjacency lists are preferred for sparse graphs; otherwise, an adjacency matrix may be preferred.

In an adjacency list representation, for each vertex in the graph, all other vertices to which the vertex has an edge are stored in that vertex's "adjacency list". A hash table may be used to associate each vertex with an array of adjacent vertices. Alternatively, an array indexed by vertex numbers, which points to a singly-linked list of the neighbors of each vertex, may be used to associate each vertex with an array of adjacent vertices.

The primary operation that uses hash tables efficiently is a lookup, e.g., given a key (e.g., a person's name), find the corresponding value (e.g., that person's telephone number). Hash tables also support efficient addition of new entries. The time spent searching for the required data is independent of the number of items stored (i.e., O(1).)

An adjacency list structure may not include a place to store data associated with the edges of a graph, such as the lengths or costs of the edges. To address this, some algorithms advocate a more object-oriented variant of the adjacency list structure, sometimes called an incidence list, which stores, for each vertex, a list of objects representing the edges incident to that vertex. To complete the structure, each edge should point back to the two vertices forming its endpoints. The extra edge objects in this version of the adjacency list cause it to use more memory than the version in which adjacent vertices are listed directly, but are a convenient location to store additional information about each edge.

Representation of Graphs

In order to execute graph-based processes in a computer, it is first decided how to store the graph. A representation closer to the abstract definition of a graph may be used. Examples of such representations are provided below
- Object oriented representation: Includes some structure for each vertex (representing whatever information being stored), and another structure for each edge (with pointers to the two vertices to which it connects). For example, a graph may include four vertices: A, B, C, and D and four edges: (A,B), (C,D), (B,C), (C,A). The object oriented representation may include a list or array of structures for each of these objects. The total space used by this representation is O(m+n), since there is a constant amount of space (one structure) per vertex or edge. Most operations in this representation involve scanning the whole list of edges, and take time O(m).
- Adjacency list: In the adjacency list representation, each vertex keeps a linked list of the neighboring vertices. The edges are typically not included. In the example above, the lists for each vertex would be:
  A: B, C
  B: A, C
  C: D, B, A This representation makes it easier to find edges connected to any particular vertex. The storage space required is also relatively small, O(m+n), since the total length of all the lists is 2m (each edge appears twice, once for each of its endpoints). It is also quite fast for many applications. The slowest operation that might commonly be used is testing whether a pair of vertices is connected by an edge. This may done by scanning through one of the lists, but can also be performed by sorting the adjacency lists and using binary search. Each edge is listed twice in the adjacency list. So, if the edges carry any extra information, such as a length, it may be difficult to keep track of both copies and make sure they have the same information.

Incidence list. By combining the adjacency list and the object oriented representation, it is possible to reap the benefits of both structures. To obtain an incidence list, one adds, to the object oriented representation, a list, for each vertex, of pointers to the edges incident to the vertex. The space required for the database may be larger than the previous two representations, but is still O(m+n).

Adjacency matrix. In some situations, it is possible to use a somewhat larger data structure in order to test, quickly, whether an edge exists. This is done by generating an n×n matrix M[i,j], with rows and columns indexed by vertices. If edge (u,v) present, a one is stored in cell M[u,v]; otherwise M[u,v] is zero. Finding the neighbors of a vertex involves scanning a row in O(n) time. But, to test if an edge (u,v) exists, it is possible to simply examine an entry in real-time. To store extra information, like edge lengths, more matrices may be used. For the example graph described above, the matrix is:

```
0 1 1 0
1 0 1 0
1 1 0 1
0 0 1 0
```

This representation is occasionally useful for performing graph computations using linear algebra. For instance, if you take the $k^{th}$ power of this matrix, an entry will be nonzero if and only if the corresponding vertices are connected by a path of k edges. For undirected graphs, the matrix will be symmetric.

Incidence matrix. This is another type matrix, which is rectangular rather than square (n×m). The rows are indexed by vertices and the columns by edges. Like the adjacency matrix, a one is stored in a cell when the corresponding vertex and edge are incident. Therefore, every column will have exactly two ones in it. For a directed graph, a similar matrix can be generated in which every column has one +1 and one −1 entry. This matrix is usually not symmetric. For the example graph described above, the incidence matrix is

```
1 0 1 0
1 1 0 0
0 1 1 1
0 0 0 1
```

According to the navigation process described herein, the type of map determines which type of representation is best. For some maps, it is possible use a variation of the adjacency matrix, which takes into account the length of each edge that represents the distance between each landmark (e.g., the kitchen is 5 feet away from the office). Since it is typically desirable to navigate in both directions, the system typically includes a separate picture of each landmark from each direction. This, in turn, is represented as separate edge. If the distance is the same from each direction, AB and BA, (which is normally the case), it is possible to draw the edge as a line with two ending arrows, each pointing to the specific direction. A single arrow denotes that the system only has a picture of the landmark from a single direction. By way of example, referring to FIG. 11, nodes A, B, C, D correspond to the kitchen, office1, office2, and entrance respectively. The graph for this example can be represented as a square matrix (FIG. 12), in which rows and columns are labeled as nodes (rows are source nodes and columns are destination nodes). The edges, connectedness and distance from each node to every other node are represented as zero or non zero values, depending on the type of connection.

Figures 12, 13:
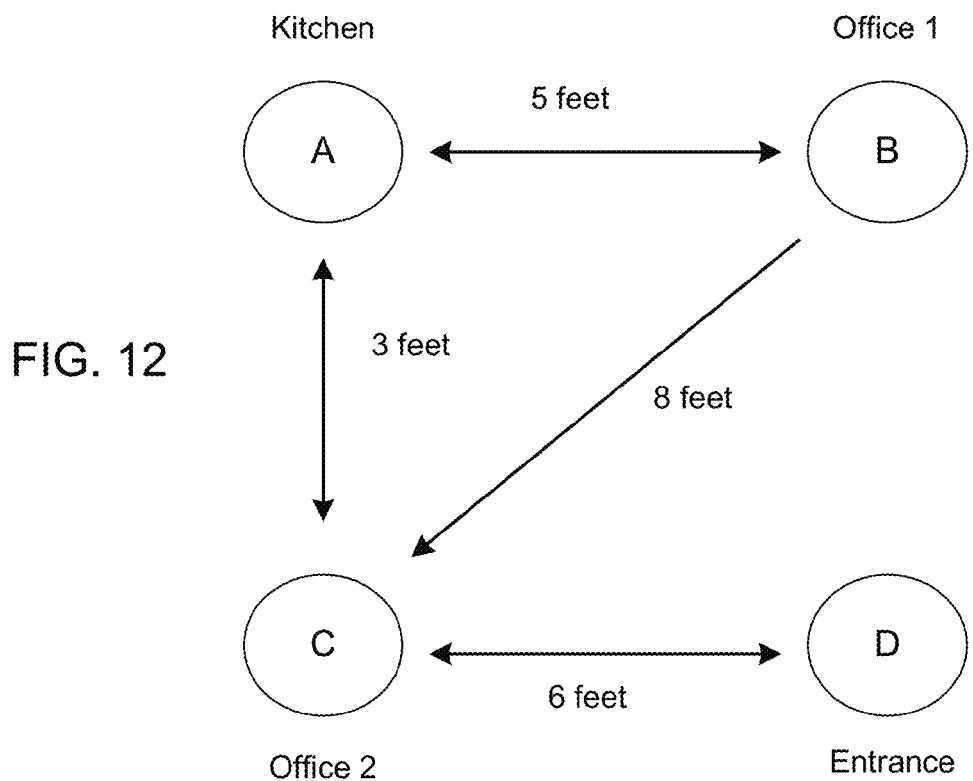
FIG. 12 is a node graph showing relationships among nodes.
FIG. 13 is a table containing information about the relationships depicted in the node graph of FIG. 12.

Referring to FIGS. 12 and 13, if there is a picture of the landmark in the database that shows the direction from the entrance (node D) to office 2 (node C), this may be represented as number 6 (i.e., 6 feet). Since both nodes have associated a picture, one from each direction (bidirectional arrow), both rows in the matrix reflect this distance. However, since there is a single picture from Office 1 (node B) to Office 2 (unidirectional arrow), the distance of 8 feet is only reflected in the Office/row in the modified adjacent matrix. In addition, since Office 2 does not include a picture pointing to Office 1, a person trying to navigate from Office 2 to Office/would need to go through the Kitchen.

By examining the values of the matrix, it is possible to determine whether a specific landmark has information about the navigation description to another location. Numeric values can be used as input to provide distance information from one location to another. In addition, zero and non zero values in the matrix can used to determine which landmarks are possible candidates for a particular navigation path. For example, node D shows that it is only possible to travel to node C. Based on this information, it is possible to narrow the search options, which also leads to faster landmark recognition.

Having information about the connectedness of each node (picture of landmark) makes it possible to generate a searchable path from any node to any other node. It is even possible to specify which nodes should, or should not, be traversed. One application of this concept is as follows. Imagine that the user has an indoor navigation map of a supermarket that includes aisles and the location of each product in each aisle. The user specifies a cooking recipe. The system determines, or the user specifies, the ingredients of the recipe. The system then provides the user a path. This path only visits the nodes necessary for accessing the ingredients. A similar scenario may be set inside a museum, in which the user wants to visit specific paintings. The system determines the path that needs to be followed, and gives the user navigation instructions to get from one room to another. In addition, when a picture is recognized, information about the picture is also provided (e.g., vocalized). Furthermore, since the paintings inside each room belong to a different picture database, knowing the parent node (the room) determines which child picture database should be loaded. This can increase recognition accuracy and speed.

The following describes a process for creating an indoor navigation map. This process, however, may be used to generate a navigation map for any environment.

The system chooses a particular landmark or object and assigns it a node. This process may be repeated until all landmarks or objects have a corresponding node assigned. The system takes a picture of every landmark or object. While doing so, the system records the distance that needs to be traveled from the point the picture was taken to a next landmark. This distance is used to provide navigation instructions to the user. Once all pictures are taken, the system determines which node are connected to other nodes. In order to have fully connected nodes pairs (e.g., bidirectionally), each node should have a picture pointing to the other node and vice versa. The system generates a modified adjacent matrix (or other type of representation of a graph) with source nodes as rows and destination nodes as columns. When a node is connected and a corresponding landmark has a picture assigned, the value in the row is the recorded distance to the other landmark. Negative values (or other conventions) may be used to determine that a node represents other type of information (e.g., description about a specific object). The system generates sub-matrices to represent other navigation layers (e.g., information about objects, coordinates, etc), determine navigation instructions or descriptions, and assign one or more such instructions or descriptions to each node. The system is then trained, e.g., in the manner described herein above or elsewhere, to recognize each landmark using object recognition techniques.

To use a map, a user moves to a particular location, and points a camera to a new landmark. If the new landmark is recognized, the system will provide further instructions on to get there or how to get to the next landmark, or a description about a particular object. Connectedness of nodes (landmarks) can provide hints as to whether there are other navigation options in the vicinity.

To search a map, the system obtains a current or desired starting position, or recognizes a landmark to obtain the current position. The system receives an end position and/or intermediate locations to visit. The system uses an adjacent matrix to verify connectedness of nodes and distance information. The system processes this information to select correct paths or subpaths between the current and ending positions.

In order to determine paths or subpaths between places, the system may employ shortest path algorithms. The shortest path problem is directed to finding a path between two vertices such that a sum of weights of constituent edges is minimized. An example is finding the quickest way to get from one location to another on a road map. In this case, the vertices represent locations and the edges represent segments of road and are weighted by the time needed to travel that segment. Shortest path algorithms may be applied to automatically find directions between physical locations, such as driving directions. The following shortest path algorithms are examples of shortest path algorithms that may be employed by the system. Other shortest path algorithms, or other proprietary or non-proprietary algorithms, may be used in addition to, or instead of the algorithms described herein.

Dijkstra's Algorithm

Dijkstra's algorithm addresses the single source problem if all edge weights are greater than or equal to zero. Without increasing run time, this algorithm can compute the shortest paths from a given start point s to all other nodes. For example, if the vertices (nodes) of the graph represent cities and edge weights represent driving distances between pairs of cities connected by a direct road, Dijkstra's algorithm can be used to find the shortest route between two cities. The input to the algorithm includes a weighted directed graph G and a source vertex s in G. We will denote V as the set of all vertices in the graph G. Each edge of the graph is an ordered pair of vertices (u,v) representing a connection from vertex u to vertex v. The set of all edges is denoted E. Weights of edges are given by a weight function w: E→[0, ∞); therefore w(u,v) is the cost of moving directly from vertex u to vertex v. The cost of an edge can be thought of as (a generalization of) the distance between those two vertices. The cost of a path between two vertices is the sum of costs of the edges in that path. For a given pair of vertices s and t in V, the algorithm finds the path from s to t with lowest cost (i.e., the shortest path). The algorithm can also be used for finding costs of shortest paths from a single vertex s to all other vertices in the graph.

The algorithm keeps, for each vertex v, the cost d[v] of the shortest path found so far between s and v. Initially, this value is 0 for the source vertex s (d[s]=0), and infinity for all other vertices, representing the fact that we do not know any path leading to those vertices (d[v]=∞ for every v in V, except s). When the algorithm finishes, d[v] will be the cost of the shortest path from s to v, or infinity, if no such path exists.

The algorithm maintains two sets of vertices S and Q. Set S contains all vertices for which we know that the value d[v] is already the cost of the shortest path and set Q contains all other vertices. Set S is initially empty, and in each step one vertex is moved from Q to S. This vertex is chosen as the vertex with lowest value of d[u]. When a vertex u is moved to S, the algorithm relaxes every outgoing edge (u,v). That is, for each neighbor v of u, the algorithm checks to see if it can improve on the shortest known path to v by first following the shortest path from the source to u, and then traversing the edge (u,v). If this new path is better, the algorithm updates d[v] with the new smaller value.

By way of example, using a street map, the algorithm works by marking the streets (tracing the street with a marker) in a certain order, until there is a route marked in from the starting point to the destination. The order is conceptually simple: from all the street intersections of the already marked routes, find the closest unmarked intersection—closest to the starting point (the "greedy" part). This is the whole marked route to the intersection, plus the street to the new, unmarked intersection. Mark that street to that intersection, draw an arrow with the direction, then repeat. Never mark to any intersection twice. When you get to the destination, follow the arrows backwards. There will be only one path back against the arrows, the shortest one.

The following pseudo code provides an example of a shortest path algorithm that may be used with the system described herein. In the following algorithm, u:=extract_min (Q) searches for the vertex u in the vertex set Q that has the least dist[u] value. That vertex is removed from the set Q and returned to the user. length(u, v) calculates the length between the two neighbor-nodes u and v. alt on line 10 is the length of the path from the root node to the neighbor node v if it were to go through u. If this path is shorter than the current shortest path recorded for v, that current path is replaced with this alt path.

```
1  function Dijkstra(Graph, source):
2     for each vertex v in Graph:        // Initializations
3         dist[v] := infinity             // Unknown distance function from s to v
4         previous[v] := undefined
5     dist[source] := 0                   // Distance from s to s
6     Q := copy(Graph)                    // Set of all unvisited vertices
7     while Q is not empty:               // The main loop
8         u := extract_min(Q)             // Remove best vertex from priority
                                              queue;
returns source on first iteration
9         for each neighbor v of u:
10            alt = dist[u] + length(u, v)
11            if alt < dist[v]            // Relax (u,v)
12                dist[v] := alt
13                previous[v] := u
```

If we are only interested in a shortest path between vertices source and target, the search can be terminated at line 9 if u=target. Now, it is possible to read the shortest path from source to target by iteration:

```
1  S := empty sequence
2  u := target
3  while defined previous[u]
4      insert u at the beginning of S
5      u := previous[u]
```

Now, sequence S is the list of vertices constituting one of the shortest paths from source to target, or the empty sequence if no path exists.

The simplest implementation of the Dijkstra's algorithm stores vertices of set Q in an ordinary linked list or array, and operation Extract-Min(Q) is simply a linear search through all vertices in Q. In this case, the running time is $O(|V|^2+|E|)$.

For sparse graphs, that is, graphs with many fewer than $|V|^2$ edges, Dijkstra's algorithm can be implemented more efficiently by storing the graph in the form of adjacency lists and using a binary heap, pairing heap, or Fibonacci heap as a priority queue to implement the Extract-Min function efficiently. With a binary heap, the algorithm requires $O((|E|+|V|)\log|V|)$ time (which is dominated by $O(|E|\log|V|)$ assuming every vertex is connected, i.e., $|E|>=|V|-1$, and the Fibonacci heap improves this to $O(|E|+|V|\log|V|)$.

A* Search Algorithm

A* (pronounced "A star") is a graph/tree search algorithm that finds a path from a given initial node to a given goal node (or one passing a given goal test). The algorithm employs a "heuristic estimate" h(x) that ranks each node x by an estimate of the best route that goes through that node. The algorithm visits the nodes in order of this heuristic estimate. The A* algorithm is therefore an example of best-first search.

Generally speaking, depth-first search and breadth-first search are two special cases of A* algorithm. Dijkstra's algorithm, as another example of a best-first search algorithm, is the special case of A* where h(x)=0 for all x. For depth-first search, we may consider that there is a global counter C initialized with a very big value. Every time, the algorithm processes a node, the algorithm assigns C to all of its newly discovered neighbors. After each single assignment, the algorithm decreases the counter C by one. Thus the earlier a node is discovered, the higher its h(x) value.

Consider the problem of route finding, for which A* is commonly used. A* incrementally builds all routes leading from the starting point until it finds one that reaches the goal. But, like all informed search algorithms, the algorithm only builds routes that appear to lead towards the goal.

To know which routes will likely lead to the goal, A* employs a heuristic estimate of the distance from any given point to the goal. In the case of route finding, this may be the straight-line distance, which is usually an approximation of road distance.

What sets A* apart from greedy best-first search is that it also takes the distance already traveled into account. This makes A* complete and optimal, i.e., A* will always find the shortest route if any exists and if h(x) was chosen correctly. It is not guaranteed to perform better than simpler search algorithms. In a maze-like environment, the only way to reach the goal might be to first travel one way (away from the goal) and eventually turn around. In this case, trying nodes closer to your destination first may cost you time.

A* maintains a set of partial solutions, i.e. paths through the graph starting at the start node, stored in a priority queue. The priority assigned to a path x is determined by the function $f(x)=g(x)+h(x)$. Here, g(x) is the cost of the path so far, i.e. the weight of the edges followed so far. h(x) is the heuristic estimate of the minimal cost to reach the goal from x. For example, if "cost" is taken to mean distance traveled, the straight line distance between two points on a map is a heuristic estimate of the distance to be traveled. The lower $f(x)$, the higher the priority (so a min-heap could be used to implement the queue). The following pseudo code is illustrative.

```
function A*(start,goal)
    var closed := the empty set
    var q := make_queue(path(start))
    while q is not empty
        var p := remove_first(q)
        var x := the last node of p
        if x in closed
            continue
        if x = goal
            return p
        add x to closed
        foreach y in successors(x)
            enqueue(q, p, y)
    return failure
```

When A* terminates its search, it has, by definition, found a path whose actual cost is lower than the estimated cost of any path through any open node. But since those estimates are optimistic, A* can safely ignore those nodes. In other words, A* will never overlook the possibility of a lower-cost path and so is admissible.

In the worst case, the A* algorithm must remember an exponential number of nodes. Several variants of A* have been developed to cope with this, including iterative deepening A* (IDA*), memory-bounded A* (MA*) and simplified memory bounded A* (SMA*) and recursive best-first search (RBFS).

While A* is generally considered to be the best pathfinding algorithm, Dijkstra's algorithm is essentially the same as A*, except there is no heuristic (H is always 0). Because it has no heuristic, Dijkstra's algorithm searches by expanding out equally in every direction. Because of this, Dijkstra's algorithm usually ends up exploring a much larger area before the target is found. This generally makes it slower than A*. Sometimes the system doesn't know the target destination. For example, assume that there is a resource-gathering unit that needs to obtain resources of some kind. It may know where several resource areas are, but it wants to go to the closest one. Here, Dijkstra's is better than A* because the closest one is not known. The other alternative is to repeatedly use A* to find the distance to each one, and then choose that path.

Implementations

The processes described herein and their various modifications (hereinafter "the processes") and the system of FIG. 1, is not limited to the hardware and software described above. All or part of the processes and the system can be implemented, at least in part, via a computer program product, e.g., a computer program tangibly embodied in an information carrier, such as one or more machine-readable media or a propagated signal, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the processes and the system can be performed by one or more programmable processors executing one or more computer programs to perform the functions of the calibration process. All or part of the processes and the system can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

The processes and system described herein may be used with, or include, any of the features described in, U.S. patent application Ser. No. 12/110,669, which was filed on Apr. 28, 2008 and U.S. Provisional Application No. 60/915,090, which was filed on Apr. 30, 2007. The contents of U.S. patent application Ser. No. 12/110,669 and U.S. Provisional Application No. 60/915,090 are hereby incorporated by reference into this application as if set forth herein in full.

Components of different embodiments described herein and in patent applications incorporated herein by reference may be combined to form other embodiments not specifically set forth above. Features and/or steps described herein may be implemented and/or ordered differently to achieve the same or similar results.

A number of embodiments of the invention have been described. Nevertheless, it will be understood that various modifications may be made without departing from the spirit and scope of the invention. Accordingly, other embodiments are within the scope of the following claims.

What is claimed is:

1. A device comprising:
   one or more processing devices;
   memory to store instructions that are executable by the one or more processing devices to:
      capture images of physical scenes, at least some of the images containing at least one or more of objects, landmarks, and/or signs in the images of the physical scenes;
      process the captured images to recognize existence of the at least one or more objects, landmarks, and/or signs in the images of the physical scenes;
      associate the recognized objects, landmarks and/or signs in the images of the physical scenes to nodes in a data structure, which correspond to the objects, landmarks, and/or signs;
      associate, with the nodes, navigation descriptions of the corresponding one or more of the objects, landmarks, and/or signs; and
      generate a construct relating the nodes to each another, the nodes being related based, at least in part, on the navigation descriptions.

2. The device of claim 1, wherein to generate a construct comprises generating an edge between the nodes representing relationships between the corresponding objects.

3. The device of claim 1, wherein to generate a construct comprises generating an edge between the nodes containing information about connectedness of the corresponding objects.

4. The device of claim 1, wherein to generate a construct comprises generating an edge between the nodes containing information about proximity of the corresponding objects.

5. The device of claim 1, wherein the nodes and the construct relating objects to each another are incorporated in a map for use in navigation, wherein the map is selected from the group consisting of a un-directed and a directed map.

6. The device of claim 1, wherein the processor is further configured to cause navigation instructions to be conveyed to a user of the device, the navigation instructions based at least in part on navigation descriptions associated with the nodes.

7. The device of claim 1, wherein the objects, landmarks, and/or signs comprise first and second sets with the first set of objects incorporated in a first layer of a map and the second set of objects incorporated in a second layer of the map.

8. The device of claim 1, wherein the construct comprises a list that associates at least one node to one or more other nodes to which the at least one node is connected.

9. The device of claim 1, wherein the construct comprises a matrix that associates at least one node to one or more other nodes to which the at least one node is connected with the matrix storing the navigation descriptions including parameters corresponding to distances between nodes.

10. The device of claim 1, further comprising instructions that are executable by the one or more processing devices to:
   perform a process to identify the route among the objects, the process identifying a path among the objects, the path having a predefined characteristic.

11. The device of claim 1, wherein the process comprises a shortest path algorithm, and wherein the predefined characteristic comprises a length of the path.

12. The device of claim 1, wherein the parameters relate to objects that are encountered along the route.

13. The device of claim 1, further comprising providing a user navigation instructions to reach an object in the first layer of the map and providing to the user information about objects in the second layer of the map and each corresponding to a node having connectedness to a node corresponding to the object in the first layer.

14. The device of claim 1, further comprising upon receiving starting and ending positions, processing information about the nodes and construct to select correct paths or sub paths between the starting and ending positions.

15. A computer program product tangibly stored on a computer readable hardware storage device, the computer program product for navigation of a physical environment, comprises instructions for causing a computer device to:
capture images of physical scenes, at least some of the images containing at least one or more of objects, landmarks, and/or signs in the images of the physical scenes;
process the captured images to recognize existence of the at least one or more objects, landmarks, and/or signs in the physical scenes;
associate the recognized objects, landmarks and/or signs in the images to nodes, the nodes corresponding to the objects, landmarks, and/or signs;
associate, with the nodes, navigation descriptions of the corresponding one or more of the objects, landmarks, and/or signs; and
generate a construct relating the nodes to each another, the nodes being related based, at least in part, on the navigation descriptions.

16. A computer implement method for navigation of a physical environment, comprises:
capturing images of physical scenes using an image input device, at least some of the images of the physical scenes containing at least one or more of objects, landmarks, and/or signs;
processing by a computing device the captured images to recognize existence of the at least one or more objects, landmarks, and/or signs in the physical scenes;
associating by the computing device the recognized objects, landmarks, and/or signs contained in the images to nodes that correspond to the objects, landmarks, and/or signs;
associating by the computing device navigation descriptions of the corresponding one or more of objects, landmarks, and/or signs; and
generating by the computing device a construct relating the nodes to each another, the nodes being related based, at least in part, on the navigation descriptions.

17. The computer program product of claim 15, wherein to generate a construct comprises instructions to generate an edge between the nodes representing relationships between the corresponding objects.

18. The computer program product of claim 15, wherein to generate a construct comprises instructions to generate an edge between the nodes containing information about connectedness of the corresponding objects.

19. The computer program product of claim 15, wherein to generate a construct comprises instructions to generate an edge between the nodes containing information about proximity of the corresponding objects.

20. The computer program product of claim 15, further comprising instructions to cause the navigation instructions to be conveyed to a user, the navigation instructions based at least in part on navigation descriptions associated with the nodes.

21. The method of claim 16, wherein generating a construct comprises generating an edge between the nodes representing relationships between the corresponding objects.

22. The method of claim 16, wherein generating a construct comprises generating an edge between the nodes containing information about connectedness of the corresponding objects.

23. The method of claim 16, wherein generating a construct comprises generating an edge between the nodes containing information about proximity of the corresponding objects.

24. The method of claim 16, further comprising conveying navigation instructions to a user, the navigation instructions based at least in part on navigation descriptions associated with the nodes.

25. A device comprising:
one or more processing devices;
memory to store instructions that are executable by the one or more processing devices to:
capture images of physical scenes associated with a user-planned path through the physical scene, at least some of the images containing at least one or more of objects, landmarks, and/or signs in the physical scenes;
process the captured images to recognize existence of the at least one or more objects, landmarks, and/or signs in the images of the physical scenes;
load a map associated with the physical scenes, which includes associated recognized objects that exist in the physical scenes;
load the user-planned path through the physical scene;
determine based on the captured images of the physical scene and recognized objects in the physical scenes, a present location of the user along the planned path;
generate navigation description instructions; and
render the navigation description instructions to the user.

26. The device of claim 25, wherein to load a map comprises accessing a generated construct nodes representing relationships between adjacent objects.

27. The device of claim 26, wherein the nodes and the construct relating objects to each another are incorporated in the map for use in the navigation, wherein the map is selected from the group consisting of a un-directed and a directed map.

28. The device of claim 27, wherein the processor is further configured to cause navigation instructions to be conveyed to a user of the device, the navigation instructions based at least in part on navigation descriptions associated with the nodes.

29. The device of claim 27, wherein the processor is further configured to provide user navigation instructions to reach an object in a first layer of the map and provide to the user information about objects in a second layer of the map and each corresponding to a node having connectedness to a node corresponding to the object in the first layer.

30. The device of claim 25, wherein the processor is further configured to:
receive starting and ending positions, and
process information about the nodes and constructs to select correct paths or sub paths between the starting and ending positions.

* * * * *